(12) United States Patent
Nammi et al.

(10) Patent No.: US 11,452,111 B2
(45) Date of Patent: *Sep. 20, 2022

(54) MULTI-ANTENNA TRANSMISSION PROTOCOLS FOR HIGH DOPPLER CONDITIONS

(71) Applicant: AT&T Intellectual Property I, L.P., Atlanta, GA (US)

(72) Inventors: SaiRamesh Nammi, Kista (SE); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,830

(22) Filed: Mar. 9, 2021

(65) Prior Publication Data
US 2021/0289510 A1    Sep. 16, 2021

Related U.S. Application Data

(63) Continuation of application No. 16/556,747, filed on Aug. 30, 2019, now Pat. No. 10,986,645, which is a
(Continued)

(51) Int. Cl.
*H04L 5/00*    (2006.01)
*H04B 7/06*    (2006.01)
(Continued)

(52) U.S. Cl.
CPC ........ *H04W 72/085* (2013.01); *H04B 7/0417* (2013.01); *H04B 7/0482* (2013.01);
(Continued)

(58) Field of Classification Search
CPC ........... H04W 72/085; H04W 72/1231; H04W 72/0413; H04W 72/0466; H04B 7/0482;
(Continued)

(56) References Cited

U.S. PATENT DOCUMENTS

| 8,311,142 B2 | 11/2012 | Gao et al. |
| 8,537,924 B2 | 9/2013 | Jöngren et al. |

(Continued)

FOREIGN PATENT DOCUMENTS

| CN | 101405966 A | 4/2009 |
| CN | 101640561 A | 2/2010 |

(Continued)

OTHER PUBLICATIONS

Communication pursuant to Article 94(3) EPC received for European Patent Application Serial No. 18724413.2 dated Jun. 30, 2021, 7 pages.

(Continued)

*Primary Examiner* — Mohamed A Kamara
(74) *Attorney, Agent, or Firm* — Amin, Turocy & Watson, LLP

(57) ABSTRACT

In response to a metric (e.g., Doppler metric) exceeding a threshold, a network node device can facilitate transmitting a message instructing a user equipment to enable reception of transmission signals having a precoding rank value of one. The network node device can send a reference signal having the precoding rank value of one, and receive feedback from the user equipment comprising an indicator of channel quality. Optionally, in response to the metric exceeding a threshold, the network node device can facilitate transmitting a message instructing the user equipment to respond to a reference signal by providing feedback comprising a first indicator of rank having a value of one, and a second indicator of channel quality.

20 Claims, 17 Drawing Sheets

US 11,452,111 B2
Page 2

Related U.S. Application Data continuation of application No. 15/588,100, filed on May 5, 2017, now Pat. No. 10,462,801.

(51) Int. Cl.
| | | |
|---|---|---|
| *H04W 72/08* | (2009.01) | |
| *H04B 7/0417* | (2017.01) | |
| *H04B 7/0456* | (2017.01) | |
| *H04W 72/04* | (2009.01) | |
| *H04W 72/12* | (2009.01) | |

(52) U.S. Cl.
CPC ......... *H04B 7/0486* (2013.01); *H04B 7/0626* (2013.01); *H04B 7/0632* (2013.01); *H04B 7/0639* (2013.01); *H04L 5/0057* (2013.01); *H04W 72/0413* (2013.01); *H04W 72/1231* (2013.01); *H04W 72/048* (2013.01); *H04W 72/0466* (2013.01)

(58) Field of Classification Search
CPC .. H04B 7/0626; H04B 7/0417; H04B 7/0486; H04B 7/0639; H04B 7/0632; H04L 5/0057

See application file for complete search history.

(56) References Cited

U.S. PATENT DOCUMENTS

| | | | |
|---|---|---|---|
| 8,638,885 B2 | 1/2014 | Evseev et al. | |
| 8,649,326 B2 | 2/2014 | Wu | |
| 8,755,810 B2 | 6/2014 | Tan et al. | |
| 8,908,747 B2 * | 12/2014 | Nammi ................ | H04B 7/0486 375/260 |
| 9,008,714 B2 | 4/2015 | Tokgoz et al. | |
| 9,048,903 B2 | 6/2015 | Pan et al. | |
| 9,107,087 B2 | 8/2015 | Li et al. | |
| 9,124,532 B2 | 9/2015 | Chen et al. | |
| 9,178,590 B2 | 11/2015 | Kuo et al. | |
| 9,252,930 B2 | 2/2016 | Qu et al. | |
| 9,294,170 B2 | 3/2016 | Chen et al. | |
| 9,401,748 B2 | 7/2016 | Chen et al. | |
| 9,414,371 B2 | 8/2016 | Pi et al. | |
| 9,425,873 B2 | 8/2016 | Jöngren | |
| 9,509,383 B2 | 11/2016 | Kim et al. | |
| 9,516,655 B2 | 12/2016 | Liu et al. | |
| 9,553,646 B1 | 1/2017 | Zhou | |
| 9,762,456 B2 | 9/2017 | Mismar et al. | |
| 9,882,617 B2 | 1/2018 | Nammi et al. | |
| 9,954,598 B2 | 4/2018 | Astrom et al. | |
| 9,999,073 B2 | 6/2018 | Nammi et al. | |
| 10,396,925 B2 | 8/2019 | Wu et al. | |
| 10,462,801 B2 * | 10/2019 | Nammi ................ | H04B 7/0626 |
| 10,708,796 B2 | 7/2020 | Sun et al. | |
| 10,986,645 B2 * | 4/2021 | Nammi ................ | H04B 7/0417 |
| 2009/0086648 A1 | 4/2009 | Xu et al. | |
| 2010/0091905 A1 | 4/2010 | Khan | |
| 2010/0246697 A1 | 9/2010 | Teng et al. | |
| 2010/0284484 A1 | 11/2010 | Jöngren et al. | |
| 2011/0111781 A1 | 5/2011 | Chen et al. | |
| 2011/0243100 A1 | 10/2011 | Ball et al. | |
| 2011/0244905 A1 | 10/2011 | Burström et al. | |
| 2011/0255483 A1 | 10/2011 | Xu et al. | |
| 2012/0057538 A1 | 3/2012 | Adhikari et al. | |
| 2012/0087401 A1 | 4/2012 | Bhattad et al. | |
| 2012/0314588 A1 | 12/2012 | Nammi | |
| 2012/0320841 A1 | 12/2012 | Miki et al. | |
| 2013/0022142 A1 | 1/2013 | Nammi | |
| 2013/0095839 A1 | 4/2013 | Venkatraman et al. | |
| 2013/0315284 A1 | 11/2013 | Nammi | |
| 2014/0133317 A1 | 5/2014 | Chen et al. | |
| 2014/0192918 A1 | 7/2014 | Park et al. | |
| 2014/0376652 A1 | 12/2014 | Sayana et al. | |
| 2015/0009836 A1 | 1/2015 | Tujkovic et al. | |
| 2015/0207556 A1 | 7/2015 | Nammi et al. | |
| 2015/0304076 A1 | 10/2015 | Lee et al. | |
| 2015/0358062 A1 | 12/2015 | Skillermark et al. | |
| 2016/0006487 A1 | 1/2016 | Ding et al. | |
| 2016/0057753 A1 | 2/2016 | Yang et al. | |
| 2016/0080058 A1 | 3/2016 | Kang et al. | |
| 2016/0143055 A1 | 5/2016 | Nammi et al. | |
| 2016/0173244 A1 | 6/2016 | Ding | |
| 2016/0212750 A1 | 7/2016 | Xu et al. | |
| 2016/0302174 A1 | 10/2016 | Chatterjee et al. | |
| 2017/0019238 A1 | 1/2017 | Sharma et al. | |
| 2017/0111930 A1 | 4/2017 | Rajagopal et al. | |
| 2017/0134080 A1 | 5/2017 | Rahman et al. | |
| 2017/0134082 A1 | 5/2017 | Onggosanusi et al. | |
| 2017/0195029 A1 | 7/2017 | Nammi et al. | |
| 2018/0176828 A1 | 6/2018 | Chen et al. | |
| 2019/0036829 A1 | 1/2019 | Ji et al. | |

FOREIGN PATENT DOCUMENTS

| | | |
|---|---|---|
| CN | 101816203 A | 8/2010 |
| CN | 102687413 A | 9/2012 |
| CN | 103155504 A | 6/2013 |
| CN | 104885393 A | 9/2015 |
| JP | 2009-524298 A | 6/2009 |
| JP | 2011-504308 A | 2/2011 |
| JP | 2011-147069 A | 7/2011 |
| JP | 2013-510541 A | 3/2013 |
| KR | 10-2010-0080548 A | 7/2010 |
| KR | 10-2013-0071494 A | 6/2013 |
| WO | 2009/057559 A1 | 5/2009 |
| WO | 2009/099151 A1 | 8/2009 |
| WO | 2015/190956 A1 | 12/2015 |
| WO | 2016/108740 A1 | 7/2016 |
| WO | 2017/078842 A1 | 5/2017 |
| WO | 2017/095471 A1 | 6/2017 |

OTHER PUBLICATIONS

First Office Action received for Chinese Patent Application Serial No. 2018800393558 dated Jun. 2, 2021, 10 pages.

Office Action received for Indian Patent Application Serial No. 201947044868 dated Aug. 3, 2021, 6 pages.

Notification of Reason for Refusal received for Korean Patent Application Serial No. 10-2019-7035966 dated May 20, 2021, 9 pages. (Including English Translation).

Qualcomm Incorporated, "UE-RS based Open-loop and Semi-open-loop Transmission", 3GPP TSG RAN WG1 #84bis, 3GPP, R1-163044, Apr. 11-15, 2016, 3 pages.

Second Office Action received for Chinese Patent Application Serial No. 201880039355.8 dated Jan. 4, 2022, 18 pages (Including English Translation).

Japanese Office Action received for Japanese Patent Application No. 2019-560631 dated Oct. 28, 2021, 9 pages (Including English Translation).

Notification of Reason for Refusal received for Korean Patent Application Serial No. 10-2019-7035966 dated Nov. 20, 2021, 9 pages. (Including English Translation).

Frenger, "MIMO in LTE and LTE-Advaneed", Ericsson Research, Oct. 5, 2009, 33 pages.

Lamare et al., "Adaptive reduced-rank equalitzation algorithms based on alternating optimization design techniquies for MIMO systems", IEEE Transactions on Vehicular Technology, Jul. 2011, vol. 60, No. 6, pp. 2482-2494.

Harris et al., "Performance Characterization of a Real-Time Massive MIMO System with LOS Mobile Channels", IEEE Journal on Selected Areas in Communications, 2017, vol. 35, No. 6, pp. 1-10.

Mogensen et al., "Centimeter-wave concept for 5G ultra-dense small cells", Vehicular Technology Conference (VTC Spring), 2014, IEEE, 7 pages.

Mahmood et al., "An Efficient Rank Adaptation Algorithm for Cellular MIMO Systems with IRC Receivers", Vehicular Technology Conference (VTC Spring), 2014, IEEE, 3 pages.

International Search Report and Written Opinion received for PCT Application Serial No. PCT/US2018/029479 dated Jul. 10, 2018, 21 pages.

(56) References Cited

OTHER PUBLICATIONS

Non-Final Office Action received for U.S. Appl. No. 15/588,100 dated Aug. 27, 2018, 45 pages.
International Search Report and Written Opinion received for PCT Application Serial No. PCT/US2018/029478 dated Jul. 17, 2018, 18 pages.
Non-Final Office Action received for U.S. Appl. No. 15/624,407 dated Jan. 18, 2019, 29 pages.
Notice of Allowance received for U.S. Appl. No. 15/624,407 dated Jun. 24, 2019, 34 pages.
International Preliminary Report on Patentability received for PCT Application Serial No. PCT/US2018/029479 dated Dec. 26, 2019, 14 pages.
International Preliminary Report on Patentability received for PCT Application Serial No. PCT/US2018/029478 dated Nov. 14, 2019, 12 pages.
Notice of Allowance received for U.S. Appl. No. 16/578,834 dated Sep. 24, 2020, 59 pages.
Non-Final Office Action received for U.S. Appl. No. 16/556,747 dated Aug. 20, 2020, 35 pages.
Communication pursuant to Article 94(3) EPC received for European Patent Application Serial No. 18724413.2 dated Nov. 12, 2020, 5 pages.
Japanese Office Action dated Feb. 16, 2021 for Japanese Patent Application No. 2019-560631, 6 pages (including translation).
Japanese Office Action received for Japanese Patent Application No. 2019-560631 dated Jun. 21, 2022, 6 pages (Including English Translation).
Notification to Grant Patent Right for Invention received for Chinese Patent Application Serial No. 201880039355.8 dated Apr. 13, 2022, 4 pages (Including English Translation).
Grant of Patent received for Korean Patent Application Serial No. 10-2019-7035966 dated May 9, 2022, 4 pages (Including English Translation).
Notice of Allowance received for U.S. Appl. No. 17/104,577 dated Apr. 20, 2022, 62 pages.

\* cited by examiner

MULTI-ANTENNA TRANSMISSION PROTOCOLS FOR HIGH DOPPLER CONDITIONS

RELATED APPLICATIONS

The subject patent application is a continuation of, and claims priority to each of, U.S. patent application Ser. No. 16/556,747 (now U.S. Pat. No. 10,986,645), filed Aug. 30, 2019, and entitled "MULTI-ANTENNA TRANSMISSION PROTOCOLS FOR HIGH DOPPLER CONDITIONS," which is a continuation of U.S. patent application Ser. No. 15/588,100 (now U.S. Pat. No. 10,462,801), filed May 5, 2017, and entitled "MULTI-ANTENNA TRANSMISSION PROTOCOLS FOR HIGH DOPPLER CONDITIONS," the entireties of which applications are hereby incorporated by reference herein.

TECHNICAL FIELD

The present application relates generally to the field of mobile communication and more specifically to multi-antenna transmission protocols for high doppler conditions.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including variants of LTE such as TD-LTE, AXGP, LTE-A and TD-LTE-A and other releases). The amount of traffic in cellular networks has experienced a tremendous amount of growth and expansion, and there are no indications that such growth will decelerate. It is expected that this growth will include use of the network not only by humans, but also by an increasing number of machines that communicate with each other, for example, surveillance cameras, smart electrical grids, sensors, home appliances and other technologies in connected homes, and intelligent transportation systems (e.g., the Internet of Things (JOT)). Additional technological growth includes 4K video, augmented reality, cloud computing, industrial automation, and V2V.

Consequently, advancement in future networks are driven by the need to provide and account for massive connectivity and volume, expanded throughput and capacity, and ultra-low latency. Fifth generation (5G) access networks, which can also be referred to as New Radio (NR) access networks, are currently being developed and expected to handle a very wide range of use cases and requirements, including among others mobile broadband (MBB) and machine type communications (e.g., involving IOT devices). For mobile broadband, 5G wireless communication networks are expected to fulfill the demand of exponentially increasing data traffic and to allow people and machines to enjoy gigabit data rates with virtually zero latency. Compared to existing fourth generation (4G) technologies, such as long-term evolution (LTE) networks and advanced LTE networks, 5G provides better speeds and coverage than the existing 4G network, targeting much higher throughput with low latency and utilizing higher carrier frequencies (e.g., higher than 6 GHz) and wider bandwidths. A 5G network also increases network expandability up to hundreds of thousands of connections.

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

Figure 16:
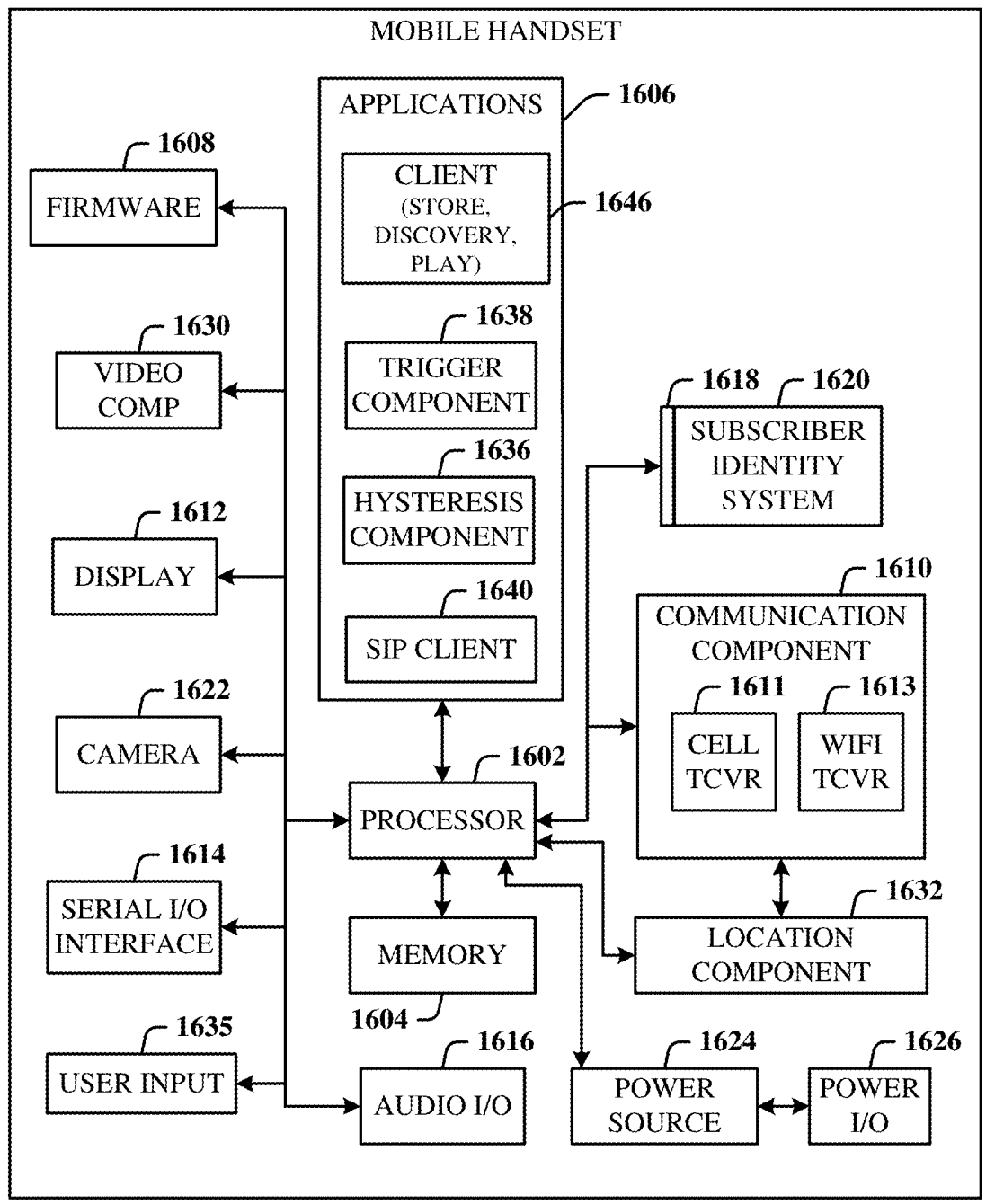

FIG. 16 illustrates an example block diagram of an example user equipment that can be a mobile handset in accordance with various aspects and embodiments of the subject disclosure.

Figure 17:
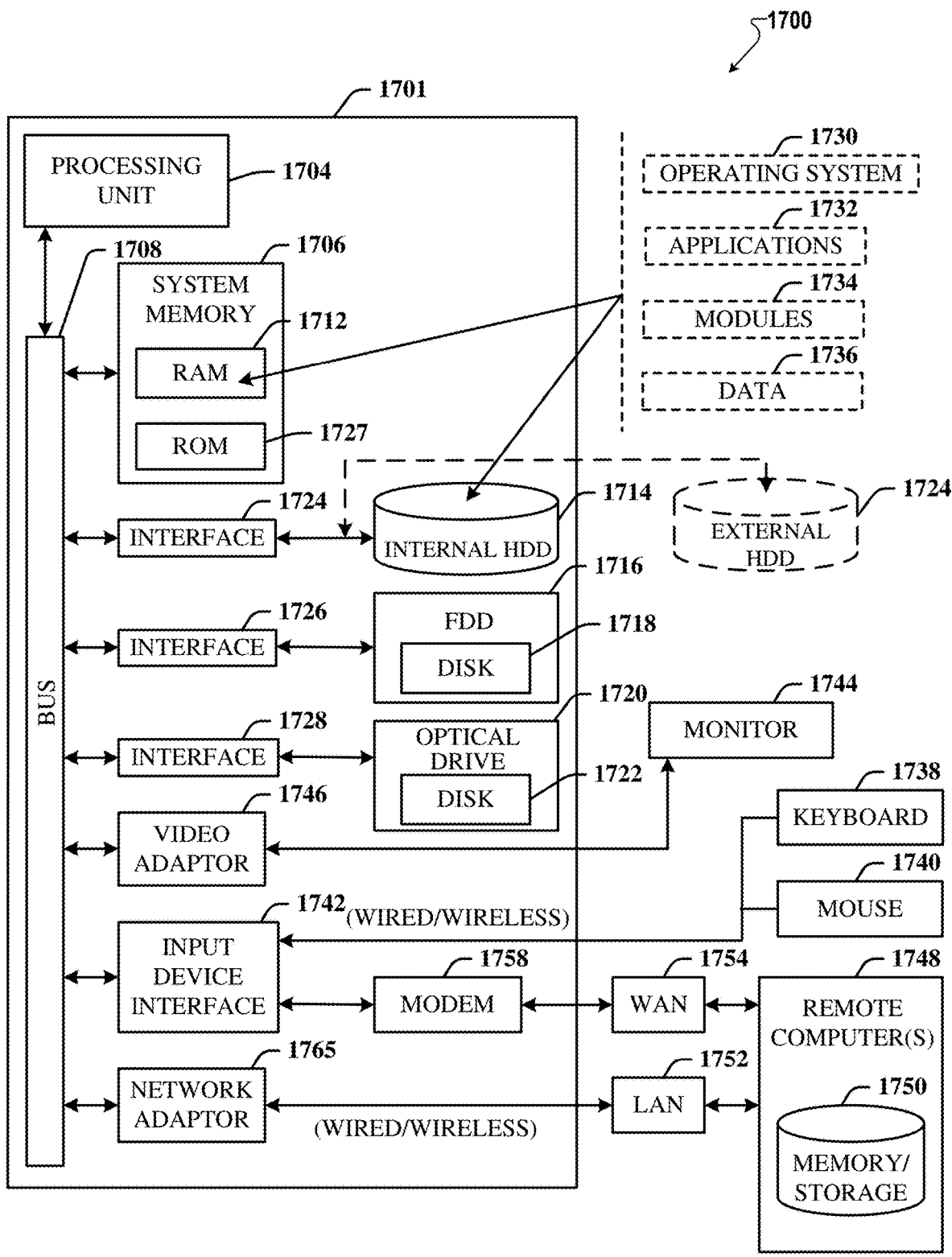

FIG. 17 illustrates an example block diagram of a computer that can be operable to execute processes and methods in accordance with various aspects and embodiments of the subject disclosure.

DETAILED DESCRIPTION

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. For example, the methods (e.g., processes and logic flows) described in this specification can be performed by devices (e.g., a user equipment (UE), a network node device, etc.) comprising programmable processors that execute machine executable instructions to facilitate performance of the operations described herein. Examples of such devices can be devices comprising circuitry and components as described in FIG. 16 and FIG. 17.

The present patent application relates to the implementation of multi-antenna transmission schemes in response to high Doppler conditions. In this regard, described herein are example computer processing systems, computer-implemented methods, apparatus, and computer program products whereby a network node device can, in response to a metric (e.g., Doppler metric) being determined to exceed a threshold, change to a different transmission protocol. The protocol can be, for example, a rank 1 precoder cycling state, whereby the network node can facilitate transmitting a message instructing a user equipment to enable reception of transmission signals having a precoding rank value of one (rank of "1"). The network node device can send a reference signal having the precoding rank value of one, and receive feedback from the UE comprising an indicator of channel quality. In other embodiments, in response to the metric being determined to exceed a threshold, the network node can use an existing closed loop MIMO protocol, or scheme, in which a codebook subset restriction (CBSR) is used. This can involve, for example, facilitating the transmission of a message instructing the user equipment to respond to a reference signal by including in a channel state information feedback a first indicator of rank (e.g., rank indicator, or RI in LTE terminology) having a value of one, and a second indicator of channel quality (e.g., channel quality indicator, or CQI in LTE terms). In both protocols of these protocols, the UE can be instructed not to report an indicator of channel state information (e.g., a pre-coding matrix indicator, or PMI in LTE terms).

Figure 1:
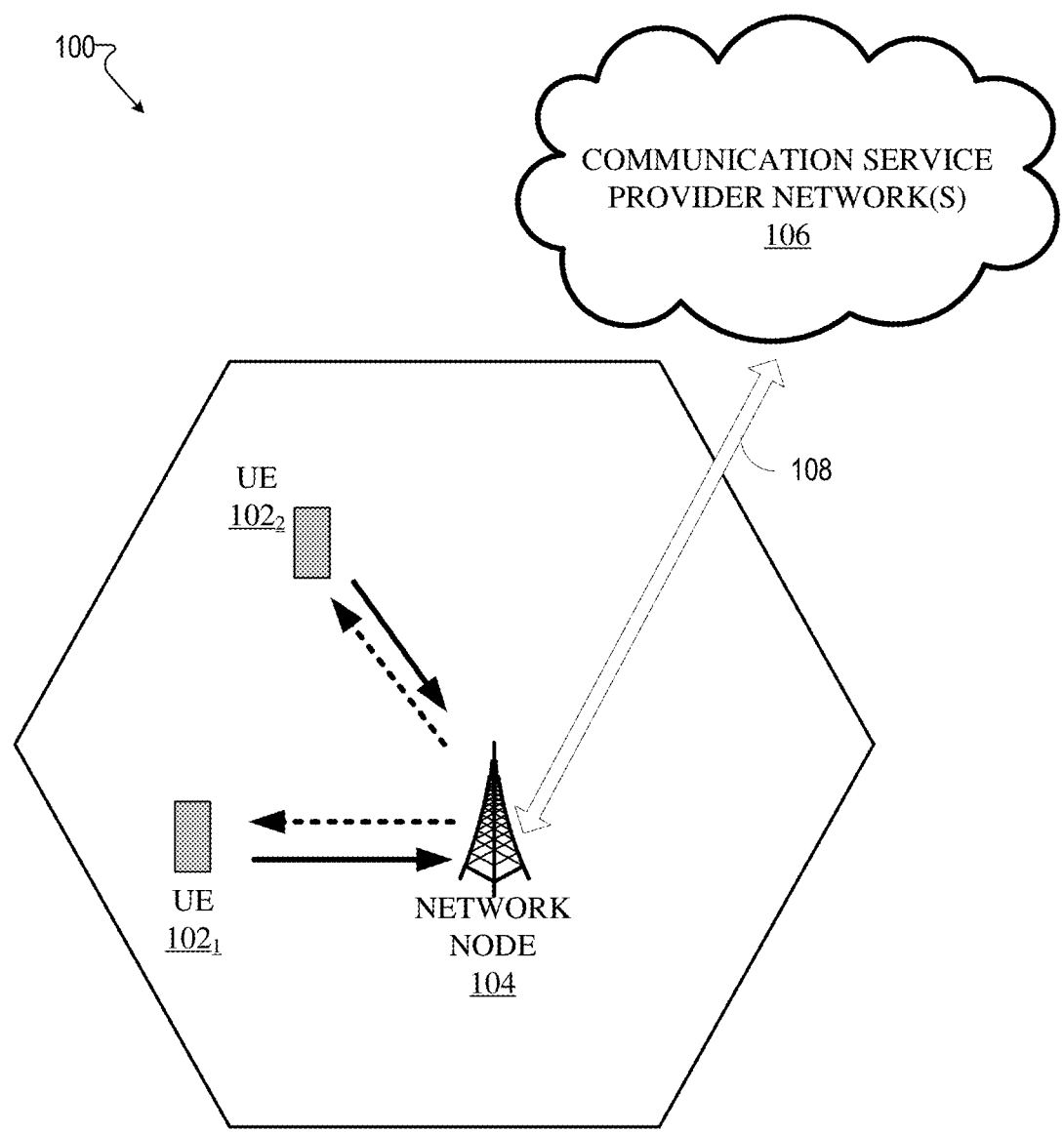
FIG. 1 illustrates an example wireless communication system in which a network node device (e.g., network node) and user equipment (UE) can implement various aspects and embodiments of the subject disclosure.

FIG. 1 illustrates an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network.

Still referring to FIG. 1, a network node can have a cabinet and other protected enclosures, an antenna mast, and multiple antennas for performing various transmission operations (e.g., MIMO operations). Network nodes can serve several cells, also called sectors, depending on the configuration and type of antenna. Examples of network nodes (e.g., network node 104) can include but are not limited to: NodeB devices, base station (BS) devices, mobile stations, access point (AP) devices, and radio access network (RAN) devices. The network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the node is referred to by some as a gNodeB device.

In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signalling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 2:
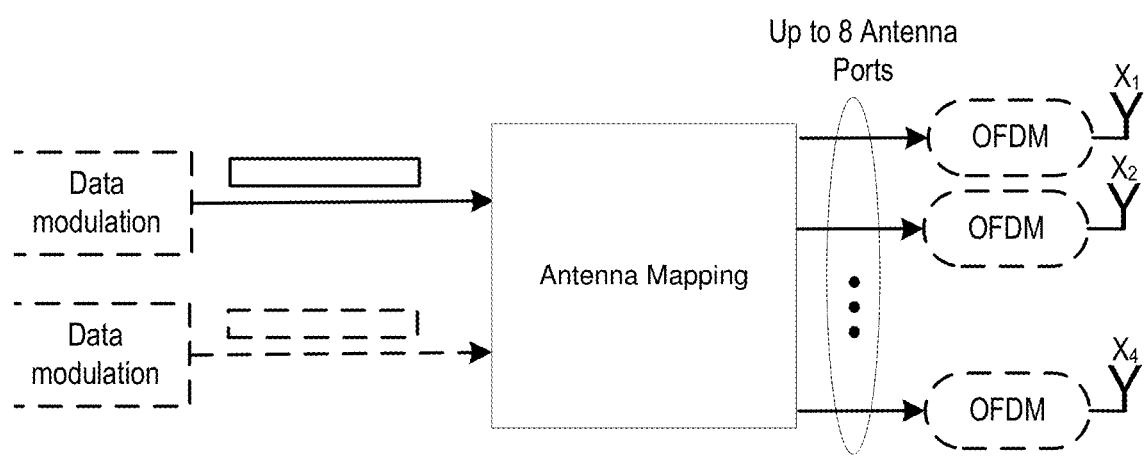
FIG. 2 illustrates a general structure of a 4G MIMO transmission protocol, or scheme, in accordance with various aspects and embodiments of the subject disclosure.

FIG. 2 illustrates the multi-antenna transmission in 4G systems for 8 antenna ports. A similar structure with more antenna ports is expected to be used for 5G systems. Antenna mapping in general, can be described as a mapping from the output of the data modulation to the different antenna ports. The input to the antenna mapping thus consists of the modulation symbols (QPSK, 16QAM, 64QAM, 256QAM) corresponding to the one or two transport blocks. To be more specific, there is one transport block per transmission time interval (TTI), except for spatial multiplexing, in which case there may be up to two transport blocks per TTI. The output of the antenna mapping comprises a set of symbols for each antenna port. The symbols of each antenna port are subsequently applied to the OFDM modulator—that is, mapped to the basic OFDM time-frequency grid corresponding to that antenna port.

Figure 3:
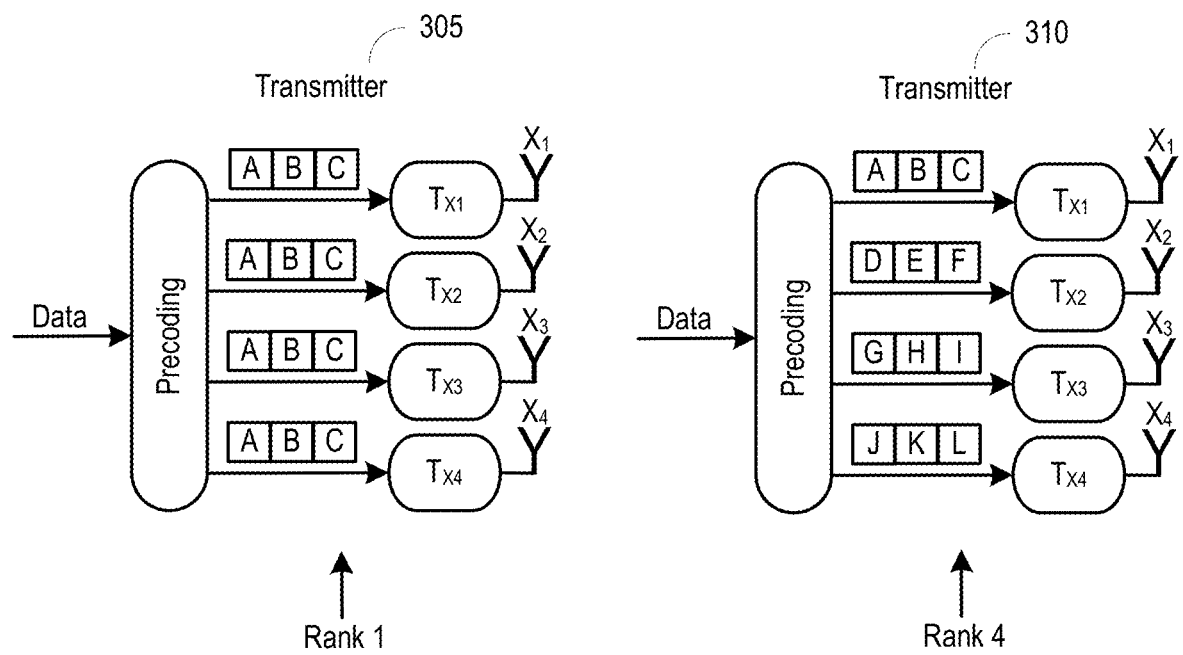
FIG. 3 illustrates an example of the concept of rank, showing a rank 1 transmitter, contrasted with a rank 4 transmitter.

Now referring to FIG. 3, another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, or, put in another way, the number of different transmission layers transmitted in parallel. As shown in FIG. 3, a multiple antenna transmitter 305 transmits in parallel on all four antennas the same content or information (A, B, and C) to the user equipment. Even though the information in each layer may be manipulated in different ways by mathematical operations, these operations do not change the information transmitted, and as such, transmitter 305 can be referred to as operating as a rank-1 transmitter. In multi-antenna transmitter 310, different pieces of information (ABC, DEF, GHI, and JKL) are transmitted in parallel simultaneously in four different layers, and as such transmitter 310 operates as a rank-4 transmitter.

Figure 4:
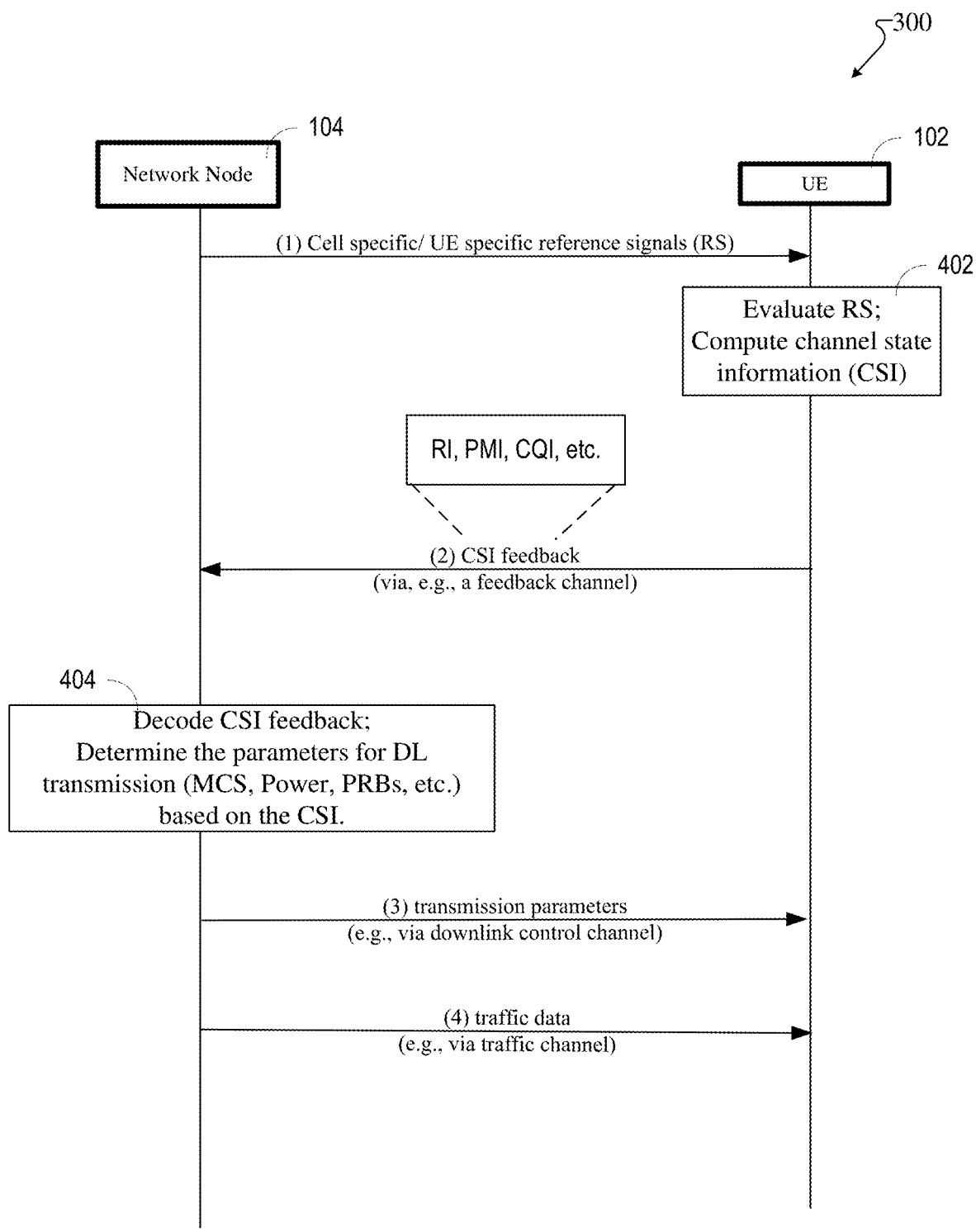
FIG. 4 illustrates an example message sequence chart between a network node device and a UE for a closed loop MIMO scheme in accordance with various aspects and embodiments of the subject disclosure.

As mentioned above, several multi-antenna transmit techniques are in existence. FIG. 4 illustrates a transaction diagram (e.g., sequence chart) related to one such technique involving a closed loop spatial multiplexing scheme that uses codebook-based precoding (wherein open loop systems do not require knowledge of the channel at the transmitter, while closed loop systems require channel knowledge at the transmitter, provided by a feedback channel by a UE). Briefly described, in this technique, a reference signal (also referred to as a pilot signal, or pilot) is first sent from the network node to the UE. From the reference signals, the UE can compute the channel estimates and the parameters needed for channel state information (CSI) reporting. In LTE, the CSI report comprises, for example, the channel quality indicator (CQI), precoding matrix index (PMI), rank information (RI), etc. The CSI report is sent to the network node via a feedback channel either on a periodic basis or on demand based CSI (e.g., aperiodic CSI reporting). The network node scheduler uses this information in choosing the parameters for scheduling of this particular UE. The network node sends the scheduling parameters to the UE on the downlink control channel called the physical downlink control channel (PDCCH). After that, actual data transfer takes place from the network node to the UE (e.g., on the physical downlink shared channel (PDSCH)).

Referring to FIG. 4 a network node (e.g., network node 104), can at transaction (1) transmit a reference signal (RS), which can be beam formed or non-beam formed, to a user equipment (e.g., UE 102). Downlink reference signals are predefined signals occupying specific resource elements within the downlink time-frequency grid. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

Other than these reference signals (CSI-RS, DM-RS), there are other reference signals, namely phase tracking reference signals, multicast-broadcast single-frequency network (MBSFN) signals, and positioning reference signals used in various purposes.

Still referring to FIG. 4, after receiving this reference signal, at block 402, the UE 102 can evaluate the reference signal and compute CSI, which can be transmitted to the network node as CSI feedback (e.g., a CSI report). The CSI feedback comprise an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

The indicator of channel state information (e.g., PMI in LTE) can be used for selection of transmission parameters for the different data streams transmitted between the network node and the UE. In techniques using codebook-based precoding, the network node and UE uses different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE transmits feedback that comprises recommendations for a suitable precoding matrix out of the appropriate codebook (e.g., points the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE.

Additionally, the CSI feedback also can comprise an indicator of channel quality (e.g., in LTE the channel quality indicator (CQI)), which indicates the channel quality of the channel between the network node and the user equipment for link adaptation on the network side. Depending which value a UE reports, the node transmits data with different transport block sizes. If the node receives a high CQI value from the UE, then it transmits data with larger transport block size, and vice versa.

Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

Still referring to FIG. 4, after computing the CSI feedback, the UE 102 can transmit the CSI feedback at transaction (2), via a feedback channel, which can be a channel separate from the channel from which the reference signal was sent. The network node can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 104, as shown in block 404 of FIG. 4, can comprise decoding the CSI feedback. The UE can decode the RI and then use the decoded information (for example, the obtained size of the CSI) to decode the remainder of the CSI feedback (e.g., the CQI, PMI, etc.). The network node 104 uses the decoded CSI feedback to determine a suitable transmission protocol, which can comprise modulation and coding schemes (MCS) applicable to modulation and coding of the different transmissions between the network node 104 and the UE 102, power, physical resource blocks (PRBs), etc.

The network node 104 can transmit the parameters at transaction (3) to the UE 102 via a downlink control channel. Thereafter and/or simultaneously, at transaction (4), traffic data (e.g., non-control data such as data related to texts, emails, pictures, audio files videos, etc.) can be transferred, via a data traffic channel, from the network device 104 to the UE 102.

The performance of closed loop MIMO systems, for example the system described in FIG. 4, degrades at high UE speeds (e.g., a mobile device moving at high speeds). The result of UEs moving at high speeds results in the Doppler effect, whereby the Doppler shift occurs when the transmitter of a signal is moving in relation to the receiver. This relative movement shifts the frequency of the signal, such that it is perceived to be different at the receiver than at the transmitter. In other words, the frequency perceived by the receiver will differ from the frequency that was actually emitted by the transmitter. The performance degradation is severe when the signal to noise ratio (SNR) is high. If the rank in transmission is high, it is also the case that the SNR is high. For high rank systems, the impact due to mismatch between the transmitter and receiver channel qualities is severe.

Figure 5:
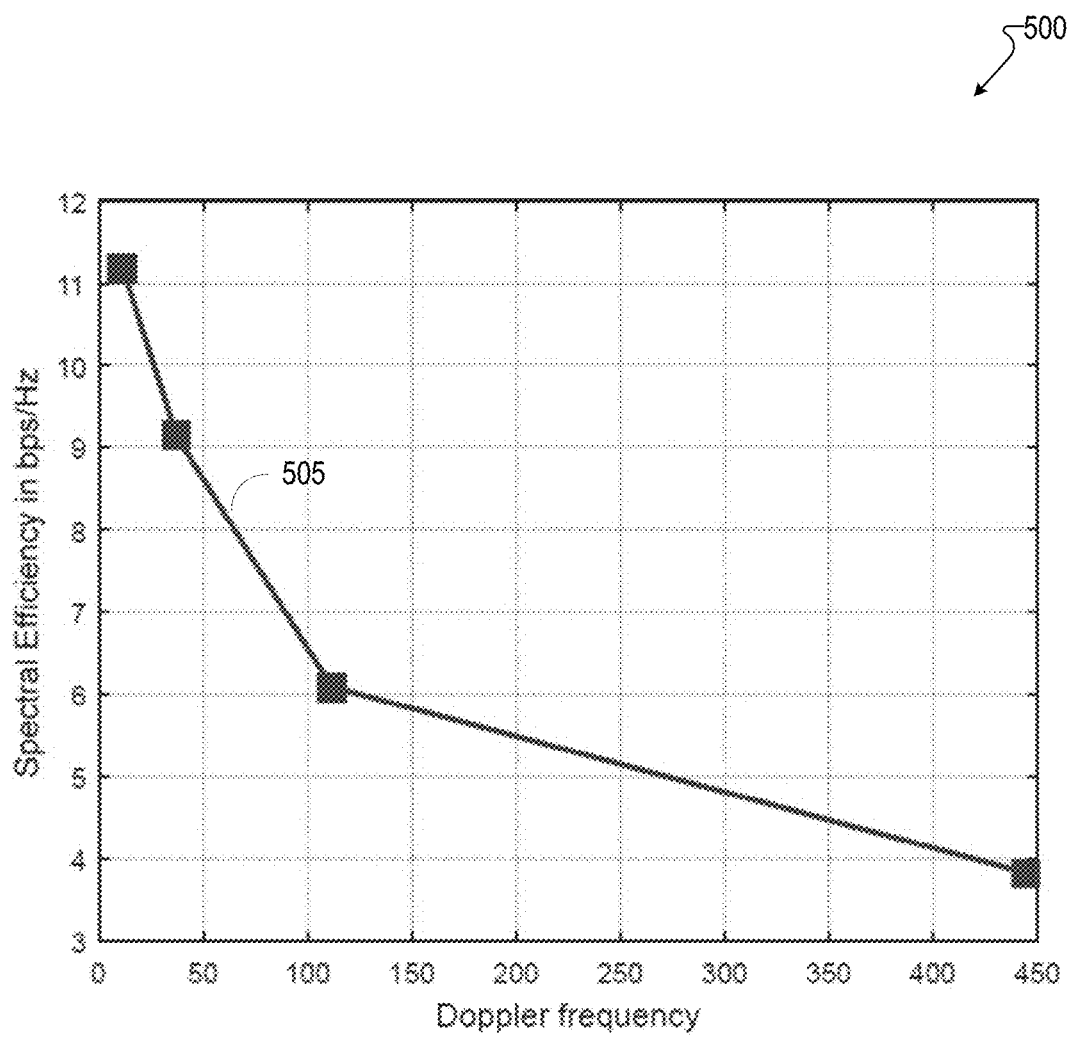
FIG. 5 illustrates a graph showing the spectral efficiency of a closed loop MIMO protocol as a function of Doppler frequency in accordance with various aspects and embodiments of the subject disclosure.

FIG. 5 illustrates a graph 500 that shows a plot 505 of the spectral efficiency for closed loop MIMO system with 4 transmit and 4 receive antennas at high SNR of 25 dB for different UE speeds (shown in Doppler frequency). While the line plot 505 is for a system having 4 transmit and 4 receive antennas, a similar spectral efficiency and Doppler frequency relationship applies for $N_{tx}$ systems with rank equal to $N_{tx}$, where $N_{tx}$ can be 2, 4, 8, 16, and so on. From observing FIG. 5, as the speed of the UE increases, the throughput decreases due to the outdated channel state information (e.g., the Doppler shift prevents the measurement by the UE of an accurate signal), such that the spectral efficiency drops as the Doppler frequency increases.

The present application describes example systems and methods that can improve the performance of MIMO systems (e.g., 5G MIMO systems) for high Doppler conditions.

The system and methods involve identifying the UE speed, and determining whether a Doppler metric threshold has been met (or exceeded), and in response to the Doppler metric determined to be exceeded, signalling the UE to change to a rank-1 precoder cycling protocol.

Figure 6:
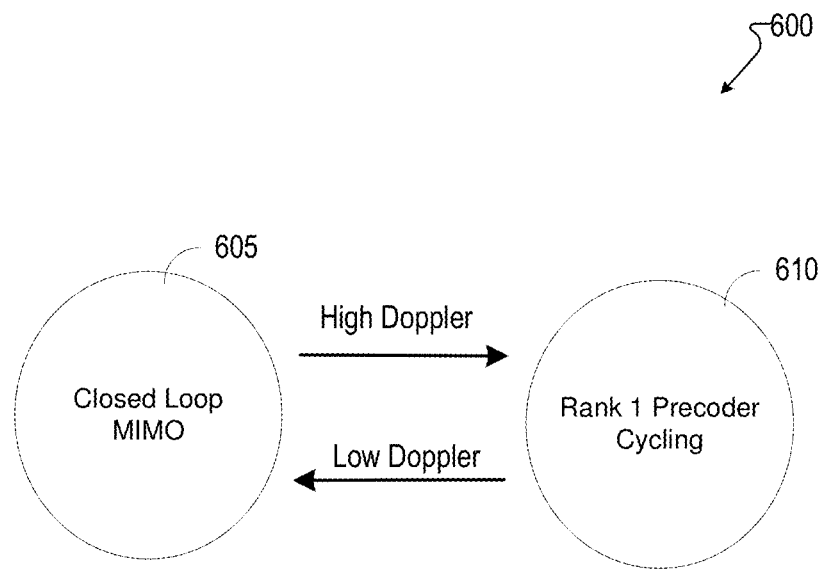
FIG. 6 illustrates a diagram showing example embodiments of toggling between a closed loop MIMO protocol and a rank 1 precoder cycling protocol depending on Doppler frequency, in accordance with various aspects and embodiments of the subject disclosure.

FIG. 6 shows a diagram 600 providing an overview of some example embodiments. In example embodiments, the protocol for transmissions can move back and forth between a closed loop MIMO state 605, and a rank-1 precoder cycling state 610, wherein the network node and the UE establish rank-1 transmissions. In response to the network (e.g., network node 104) detecting that a UE (e.g., UE 102) is moving with a high Doppler frequency, resulting in a metric related to the Doppler frequency (e.g., $D_m$) being greater than a threshold (e.g., $D_{th}$), wherein the threshold can be a value equal to $D_m$, or a value greater than $D_m$, in example embodiments, the network (e.g., network node 104) can communicate to the UE a message instructing the UE to change its reception protocol to be configured to engage in a rank-1 (e.g., indicator of rank=1, or RI=1) precoder cycling. The UE can change its reception protocol (e.g., configure resources) to enable it to receive signals transmitted to the UE with a rank-1 protocol (such as a rank-1 reference signal). With rank-1 precoder cycling, the network node can use random precoders at the transmission side. The rank-1 precoder cycling can be applied either at the resource block level (RB) or at the resource element level (RE). In high Doppler conditions, transmissions in which the rank equals to one can offer increased reliability, thereby reducing the CSI estimation error due to the high Doppler shift between the transmitter and the receiver. Similarly, whenever the network detects the UE changed its speed and moving with a slow speed, it will inform the UE to revert back to a closed loop MIMO mode to report CSI in a more conventional way (e.g., as described in FIG. 4 above).

Figure 7:
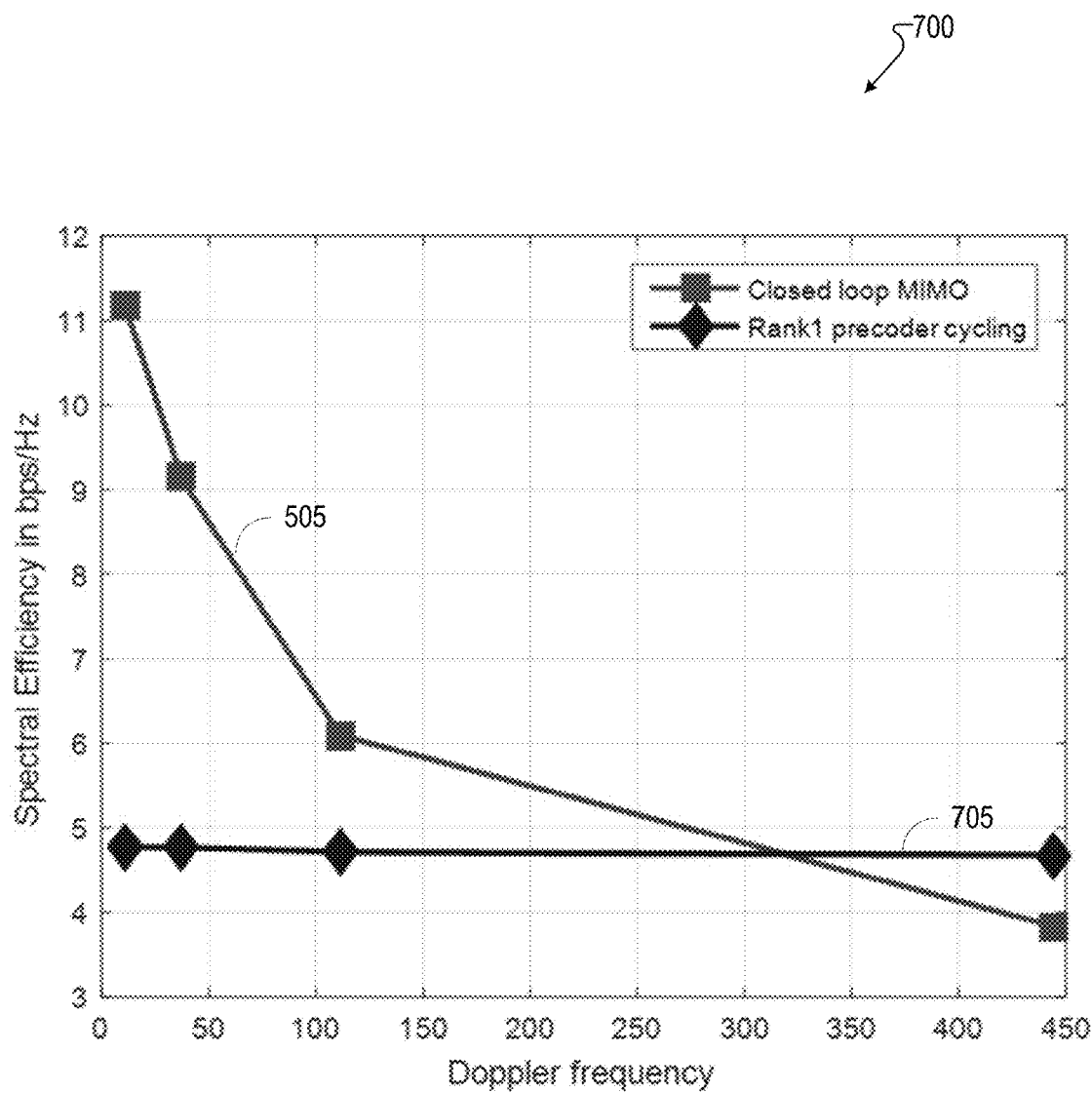
FIG. 7 illustrates a graph showing the spectral efficiency of both a closed loop MIMO protocol and a rank-1 precoder cycling protocol as a function of Doppler frequency, in accordance with various aspects and embodiments of the subject disclosure.

FIG. 7 shows a graph 700 depicting the spectral efficiency of transmissions using closed loop MIMO, contrasted with the spectral efficiency with rank-1 transmissions (e.g., the rank-1 precoder cycling transmissions described in this application). In addition to the plot 505 for the spectral efficiency of a close loop MIMO system as a function of Doppler frequency, FIG. 7 shows a second plot 705 of the spectral efficiency for transmissions relating to the rank-1 precoder cycling as a function of Doppler frequency with wideband CQI. It can be observed from FIG. 7 that the rank-1 precoder cycling performance varies very little. Referring to FIG. 7, at a certain Doppler frequency threshold, a rank-1 transmission can yield a greater spectral efficiency than the spectral efficiency of transmissions made using closed loop MIMO having a rank greater than 1. For example, in accordance with the example graph shown in FIG. 7, the network (e.g., network node 104) should have the UE be configured for rank-1 precoder cycling when the UE's Doppler frequency is above the threshold of about 320.

Figure 8:
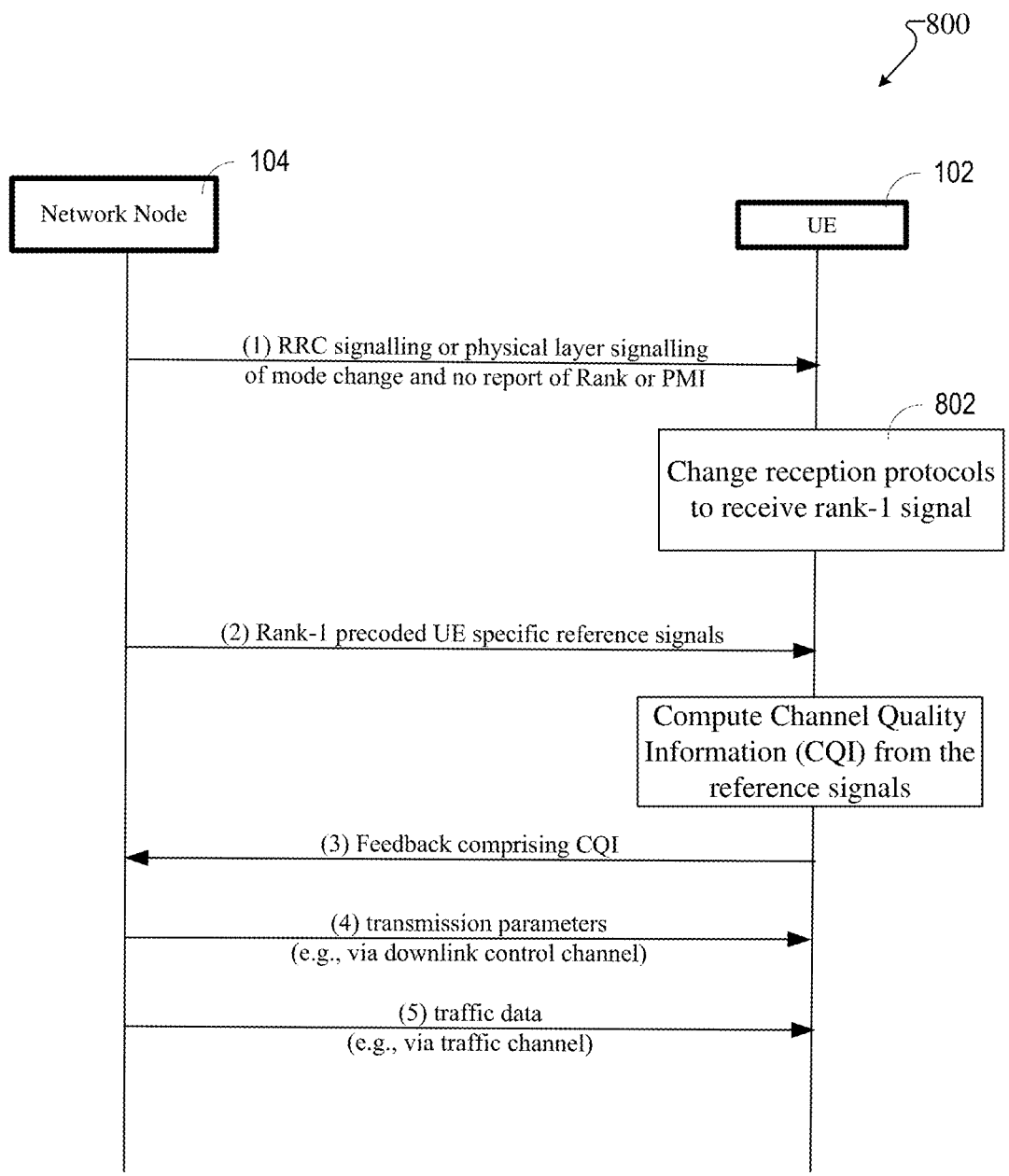
FIG. 8 illustrates a message sequence chart between a network node and a UE for a rank-1 precoder cycling protocol, in accordance with various aspects and embodiments of the subject disclosure.

FIG. 8 shows an example of a transaction diagram 800 (e.g., sequence chart) in accordance with example embodiments in which the network node (e.g., network node 104) and UE (e.g., UE 102) enter into a rank-1 precoder cycling state when a Doppler metric exceeds a threshold. Assume that the network node is receiving the CSI (conventional) from the feedback channel (e.g., operating in a closed loop spatial MIMO state 605, as shown in the example of FIG. 4). As the signals from the network node to the UE degrade from the doppler effect, not only can data transmissions suffer from this effect, but reference signals from the network node can also suffer from this effect, which can result in CSI estimations based on a degraded reference signal. In example embodiments, if the network node determines that the Doppler frequency reaches or exceeds a threshold, the network node at transaction (1) of FIG. 8 sends either an RRC signalling (higher layer signalling) or physical layer signalling message to the UE to change its configurations to receive RB level rank-1 precoded cycling signals. This signalling message can also instruct the UE to include in its feedback an indicator of channel quality CQI, while excluding the indicator of rank (e.g., RI) and the indicator of channel state information (e.g., PMI). At block 802, the UE, in response to signalling message, can configure its resources to receive a rank-1 transmission. Next at transaction (2), the network node sends a UE specific reference signal as a rank-1 precoded transmission. The UE, having been configured to receive a rank-1 signal at block 802, receives the reference signal and at block 804 evaluates the reference signal and computes an indicator of channel quality (CQI). At transaction (3), the UE returns feedback comprising an indicator of channel quality. Here, unlike the closed loop MIMO case of FIG. 4, it is not necessary for the UE to report back an indicator of rank (e.g., RI) or channel state information (e.g., PMI), since the network node has already made the decision to transmit at rank-1, and with characteristics that do not require a PMI feedback. The indicator of channel quality however, can be useful to identify which resource blocks would be better to use. The reported CSI feedback can be at a sub-band level, or at wideband level, or both. For RB level precoder cycling, there is no need to inform the UE about the precoders used at the transmitter, as the UE reports on the rank-1 precoded CSI-RS. For data transmission, the network uses the same precoders it used during the transmission of CSI-RS and transmits DM-RS which are precoded with the same precoders. Hence, this scheme is completely transparent to the UE.

In other embodiments, the network node can use transmissions precoded at the resource element (RE) level (not RB level). In this protocol or scheme, the network node can indicate what precoders it is planning to use at the RE level. The precoders can be fixed in a standard (e.g., the 5G standard) such that both the network and the UE knows about the precoders used at the RE level. The UE reports the CQI assuming that the network will use the pre-defined precoders.

In other embodiments, the network node can be operable to transmit more than one reference signal for the UE's evaluation, wherein each reference signal can differ at the RB level (or, alternatively, at the RE level). As such, the CQI determined by the UE can be for different reference signals, and multiple CQIs can be reported as part of the feedback. After receiving the multiple CQIs, the network node can decide, or determine, which one to select to determine the further downstream transmission scheduling parameters.

Figure 9:
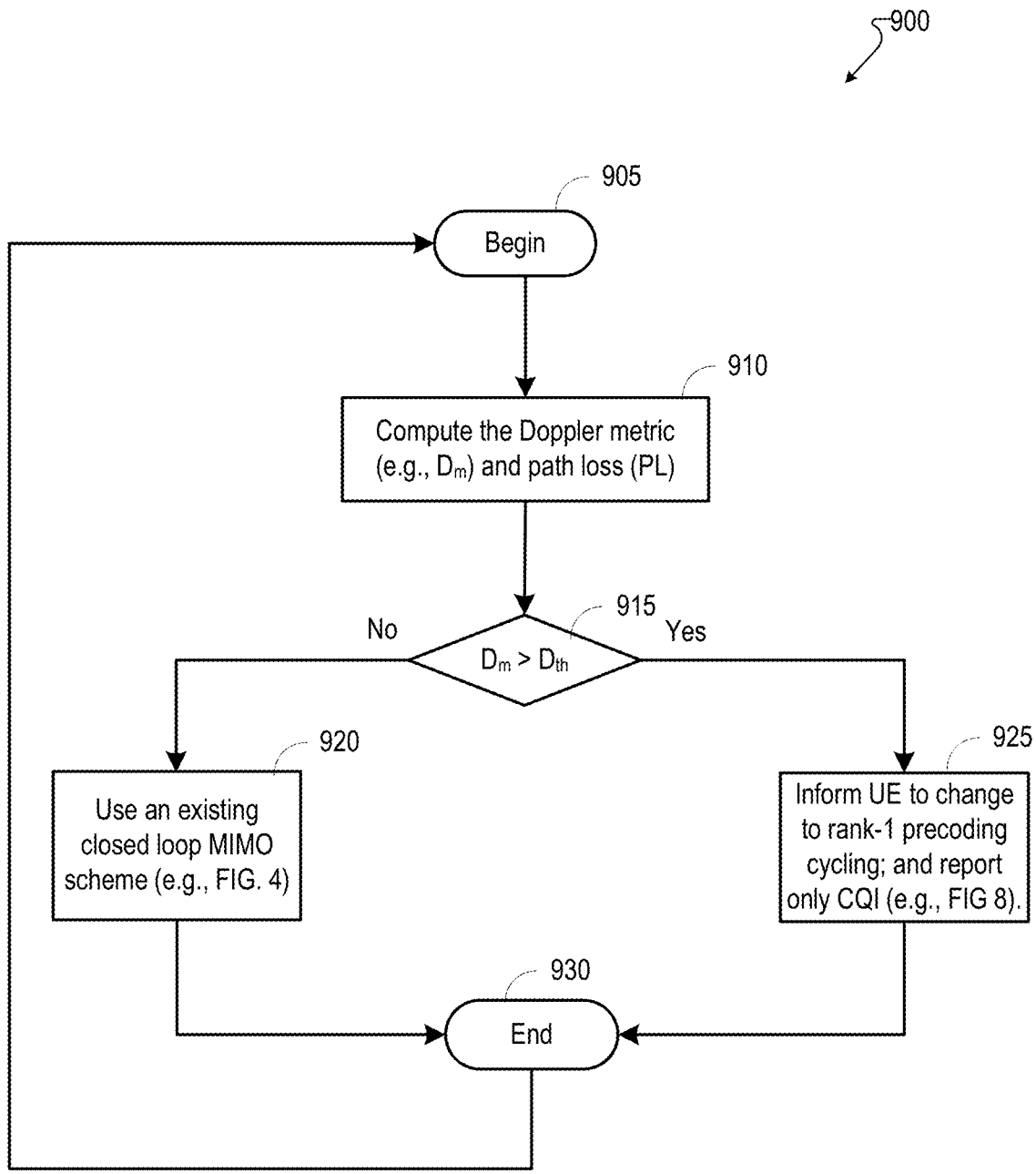
FIG. 9 illustrates an example flow chart having a Doppler metric as a decision criteria, in accordance with various aspects and embodiments of the subject disclosure.

FIG. 9 shows a flowchart 900 depicting an example method that can be performed by a network node (e.g., network node 104). The flowchart can begin at step 905, wherein it can be in a transmission state (e.g., closed loop MIMO, as described in the example of FIG. 4). At step 910, the network node determines the Doppler metric, and path loss (PL), for the specific UE. At step 910, the network node determines whether the UE is moving at a high speed (high Doppler) or low speed (low Doppler). The network node can determine a Doppler metric ($D_m$) representative of the speed of the UE. Example embodiments of the Doppler metric can utilize various measurements. For example, in a $D_m$ based on a direct speed measurement, the network node can determine the direct speed of the UE, for example, by using a global positioning system (GPS) to obtain speed measurements of the user equipment (e.g., determine the distance per time that the UE has moved). The speed measurements can be measured at different times (or, at multiple intervals). The network node can determine a $D_m$ comprises the average of the speed measurements. In example embodiments, the Doppler metric can also be based on the rate of change of uplink channel estimates. Here, the network node can estimate the uplink channel, and the rate of change of the uplink channel provides a measure of the Doppler metric $D_m$. The doppler metric can also be based on the rate of change of the indicator of channel quality (e.g., CQI in LTE), wherein the CQI is the channel quality information reported in a CSI feedback by the UE at any given moment. Here, the Doppler metric can be the change of CQI ($\Delta$CQI) over change in time ($\Delta$T). The Doppler metric can thus be computed as $D_m=\Delta CQI/\Delta T$.

Still referring to FIG. 9, a Doppler threshold (e.g., $D_{th}$) can be set, which is the point at which the spectral efficiency degrades below the spectral efficiency level provided by a rank-1 transmission due to the Doppler effect (e.g., as shown in FIG. 7). At step 915, a determination can be made (e.g., by the network node 104) as to whether the Doppler metric associated with the UE exceeds the threshold (e.g., $D_m>D_{th}$). If the Doppler metric associated with the UE does not exceeds the threshold, then at step 920, the operations between the network node and UE can continue to use an existing closed loop MIMO scheme (e.g. the example as described in FIG. 4). If the Doppler metric exceeds the threshold, then at step 925, the network node can initiate a change to a rank-1 precoding cycling state (e.g., the example as described in FIG. 8). At step 930, the method can end, for example, in which the network node and UE carry on using an existing closed loop MIMO scheme, or using a rank-1 precoding cycling scheme. The process can repeat again at step 905. Thus, the network node periodically determines whether the Doppler metric exceeds a threshold, and in response to that determination, uses an existing closed loop MIMO scheme, or initiates a change to use rank-1 transmissions.

Figure 10:
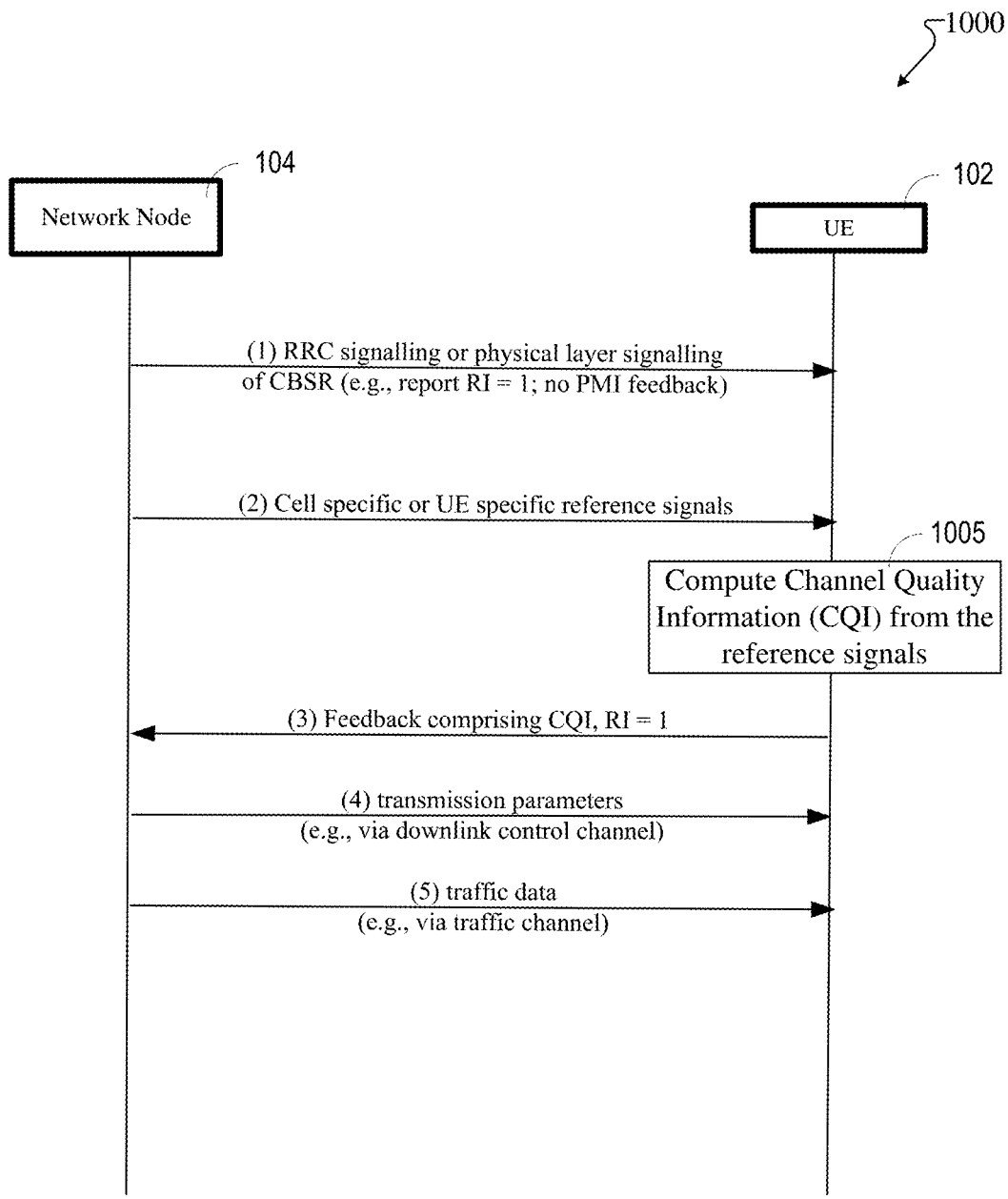
FIG. 10 illustrates a message sequence chart between a network node and a UE involving use of a codebook subset restriction (CBSR), in accordance with various aspects and embodiments of the subject disclosure.

FIG. 10 illustrates a transaction diagram representative of example embodiments in which, in response to a determination that a Doppler metric exceeds a threshold, a closed loop MIMO scheme is maintained, but with restrictions in the UE's CSI feedback reporting. The diagram presumes a condition in which a determination has been made that the Doppler metric exceeds the threshold. At transaction (1), the network node transmits a signal to the UE instructing it to report a rank of 1 in its CSI feedback. Here, the UE does not even need to know if the network wants to apply rank-1 precoder cycling. That is to say, there is no need to signal the transmission mode change from the network as with the example described in FIG. 8. However, even though there is no explicit indication of this rank-1 transmission to the UE, the network still uses a closed loop MIMO scheme and informs the UE to select a rank of 1 in its feedback. This can be done by the use of a codebook subset restriction (CBSR), using either radio resource control (RRC) signaling or a physical layer signaling, by setting only those precoder indices that correspond to rank equal to one. The UE can also be instructed not to report an indicator of channel state information (e.g., not to report a PMI). At transaction (2), the network node transmits a reference signal to the UE. The UE at stage 1005 evaluates the reference signal, which comprises determining an indication of channel quality (e.g., CQI in LTE). At transaction (3), the UE provides feedback, and based on the CBSR, provides an indicator of rank of 1 (e.g., RI of 1), and the indicator of channel quality (e.g., CQI). At transaction (4) the transmission parameters are sent to the UE, and at transaction (5), traffic data can be sent to the UE based on the selected transmission parameters.

Figure 11:
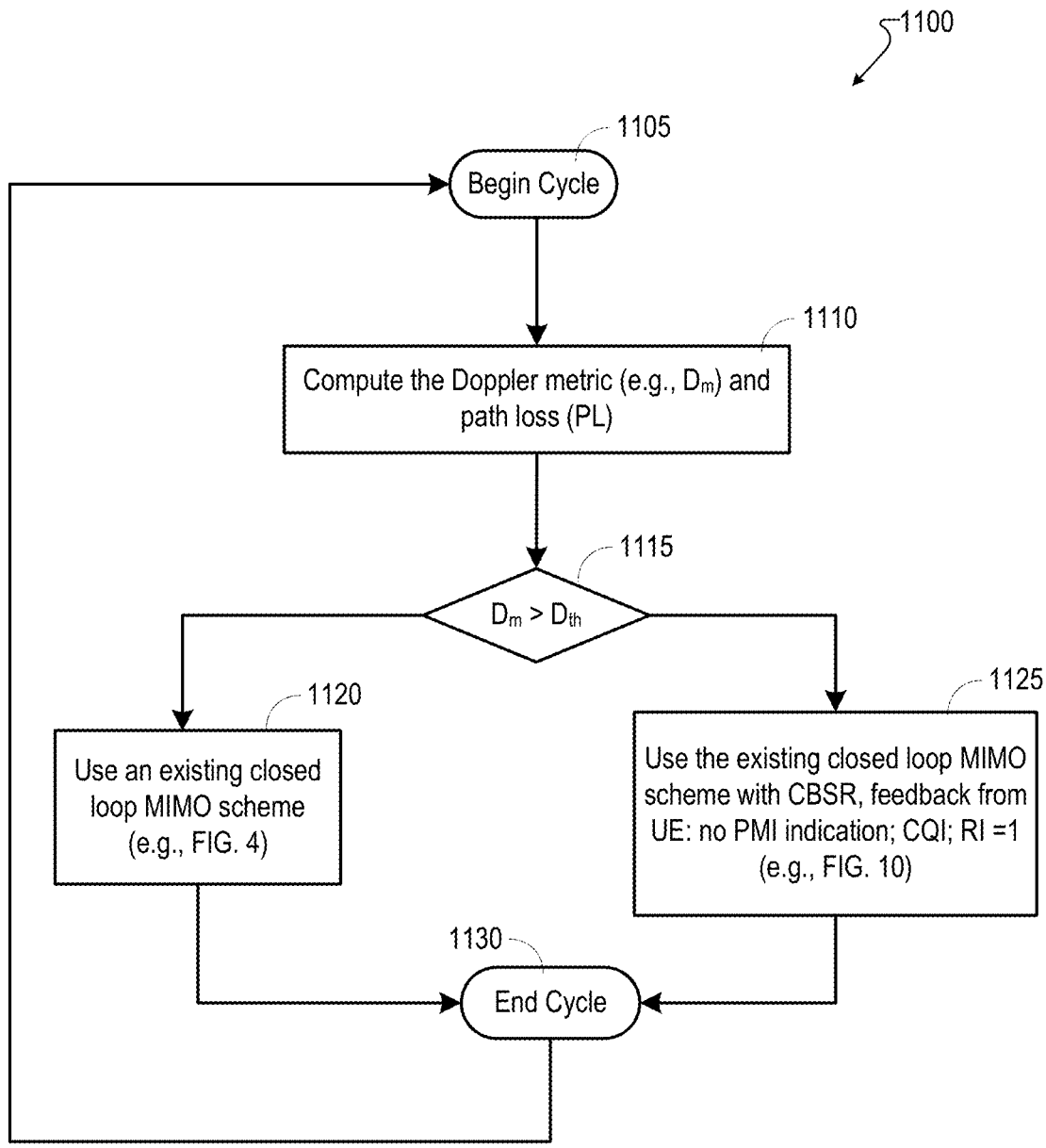
FIG. 11 illustrates another example flow chart having a Doppler metric as a decision criteria, in accordance with various aspects and embodiments of the subject disclosure.

FIG. 11 shows a flowchart 1100 depicting an example method that can be performed by a network node (e.g., network node 104) in which a closed loop MIMO scheme with CBSR (as described in FIG. 10) is used in response to a Doppler metric exceeding a threshold. The flowchart can begin at step 1105, wherein it can be in a particular transmission state (e.g., closed loop MIMO, as described in the example of FIG. 4). At step 1110, the network node determines the Doppler metric, and path loss (PL), for the specific UE. At step 1110, the network node determines whether the UE is moving at a high speed (high Doppler) or low speed (low Doppler). The network node can determine a Doppler metric ($D_m$) representative of the speed of the UE. Example embodiments of the Doppler metric can utilize various measurements, for example as described above in reference to FIG. 9, step 910. At step 1115, a determination can be made (e.g., by the network node 104) as to whether the Doppler metric associated with the UE exceeds the threshold (e.g., $D_m>D_{th}$). If the Doppler metric associated with the UE does not exceeds the threshold, then at step 1120, the operations between the network node and UE can continue to use an existing closed loop MIMO scheme (e.g. the example as described in FIG. 4). If the Doppler metric exceeds the threshold, then at step 1125, the network node can send a signal to the UE having the CBSR, and an instruction to provide CQI feedback, and a rank of 1 (but no need to provide a PMI). An example of the interaction in accordance with FIG. 11 between the network node and UE can be as described in FIG. 8. At step 1130, the method can end, for example, in which the network node and UE carry on using an existing closed loop MIMO scheme, or using a rank-1 precoding cycling scheme. The process can repeat again at step 1105. Thus, the network node periodically determines whether the Doppler metric exceeds a threshold, and in response to that determination, uses an existing closed loop MIMO scheme, or an existing closed loop MIMO scheme with CBSR, resulting CQI and a rank indicator of 1 in the UE's feedback to the network node.

In accordance with example embodiments, a network node and user equipment can be operable to perform example methods, as illustrated in flow diagrams as described in FIG. 12, FIG. 13, FIG. 14, and FIG. 15 in accordance with various aspects and embodiments of the subject disclosure.

Figure 12:
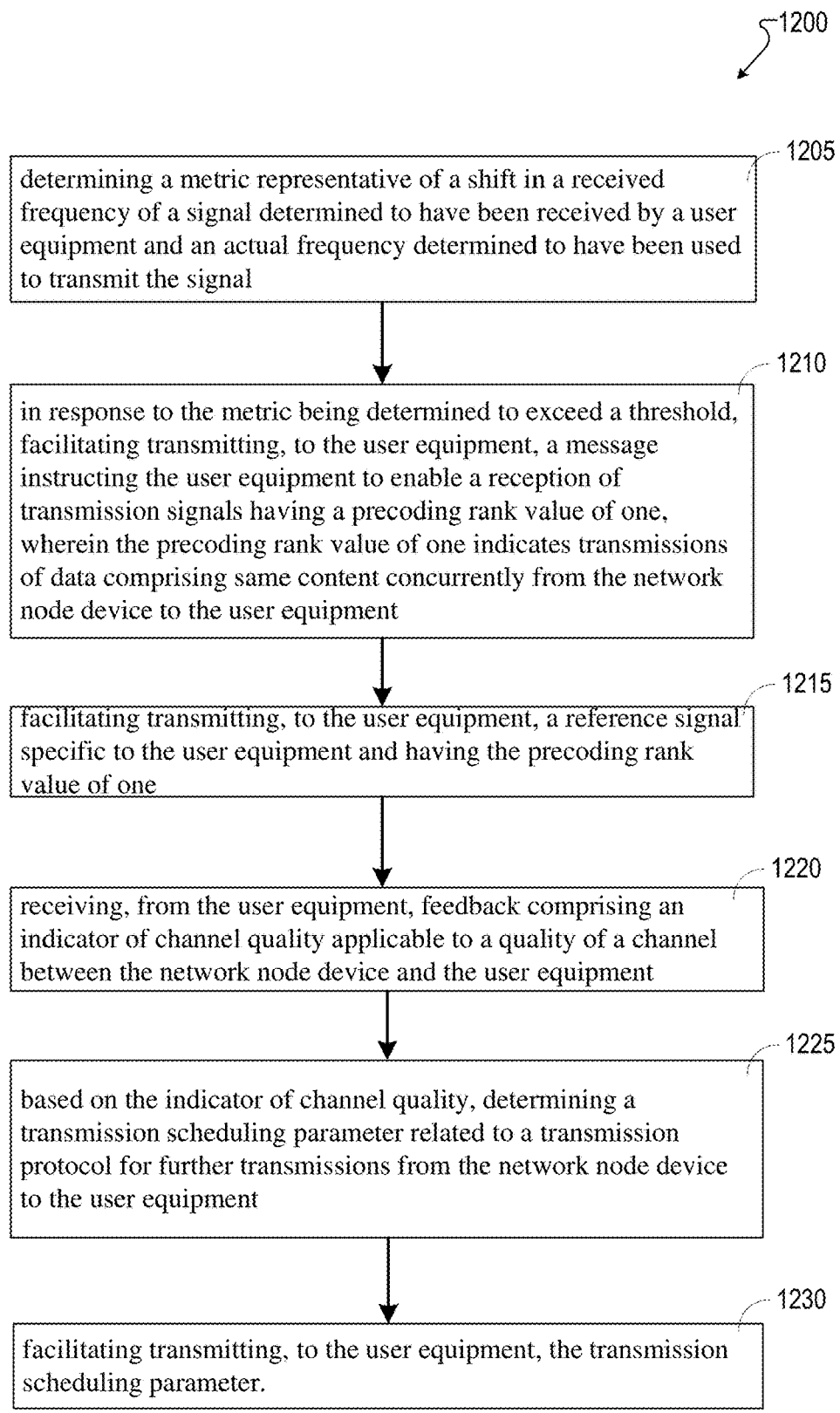
FIG. 12 illustrates operations that can be performed by a network node device relating to rank-1 precoder cycling in accordance with various aspects and embodiments of the subject disclosure.

In non-limiting embodiments, as shown in FIG. 12 chart 1200, a network node device is provided, comprising a processor and a memory that stores executable instructions that, when executed by the processor, facilitate performance of operations. As shown at step 1205, the operations can comprise determining a metric representative of a shift in a received frequency of a signal determined to have been received by a user equipment and an actual frequency determined to have been used to transmit the signal.

The operations can further comprise, at step 1210, in response to the metric being determined to exceed a threshold, facilitating transmitting, to the user equipment, a message instructing the user equipment to enable a reception of transmission signals having a precoding rank value of one, wherein the precoding rank value of one indicates transmissions of data comprising same content concurrently from the network node device to the user equipment.

The operations can further comprise, at step 1215, facilitating transmitting, to the user equipment, a reference signal specific to the user equipment and having the precoding rank value of one.

The operations can further comprise at step 1220, receiving from the user equipment feedback comprising an indicator of channel quality applicable to a quality of a channel between the network node device and the user equipment.

At step 1225, the operations can further comprise, based on the indicator of channel quality, determining a transmission scheduling parameter related to a transmission protocol for further transmissions from the network node device to the user equipment.

The operations can at step 1230 comprise, facilitating transmitting to the user equipment the transmission scheduling parameter.

The operations can further comprise facilitating transmitting, to the user equipment, traffic data based on the transmission protocol.

The determining the metric can comprise obtaining speed measurements of the user equipment at multiple times, and the metric can comprise an average of the speed measurements. Determining the metric can also comprise determining a rate of change of a characteristic of an uplink channel from the user equipment to the network node device. Determining the metric can also comprise determining a rate of change of channel quality information of channel quality information of previous transmissions from the network node device to the user equipment, the previous transmissions occurring prior to the determining the metric.

The transmission scheduling parameter can comprise a modulation and coding parameter applicable to modulation and coding of data streams for the further transmissions from the network node device to the user equipment.

The indicator of channel quality can comprise a first indicator of channel quality, and the message instructing the user equipment can further comprise an instruction to exclude from the feedback a second indicator of rank representative of a number of different data streams transmitted between the network node device and the user equipment, and a third indicator of channel state information used to select a precoding matrix for the further transmissions from the network node device to the user equipment.

Figure 13:
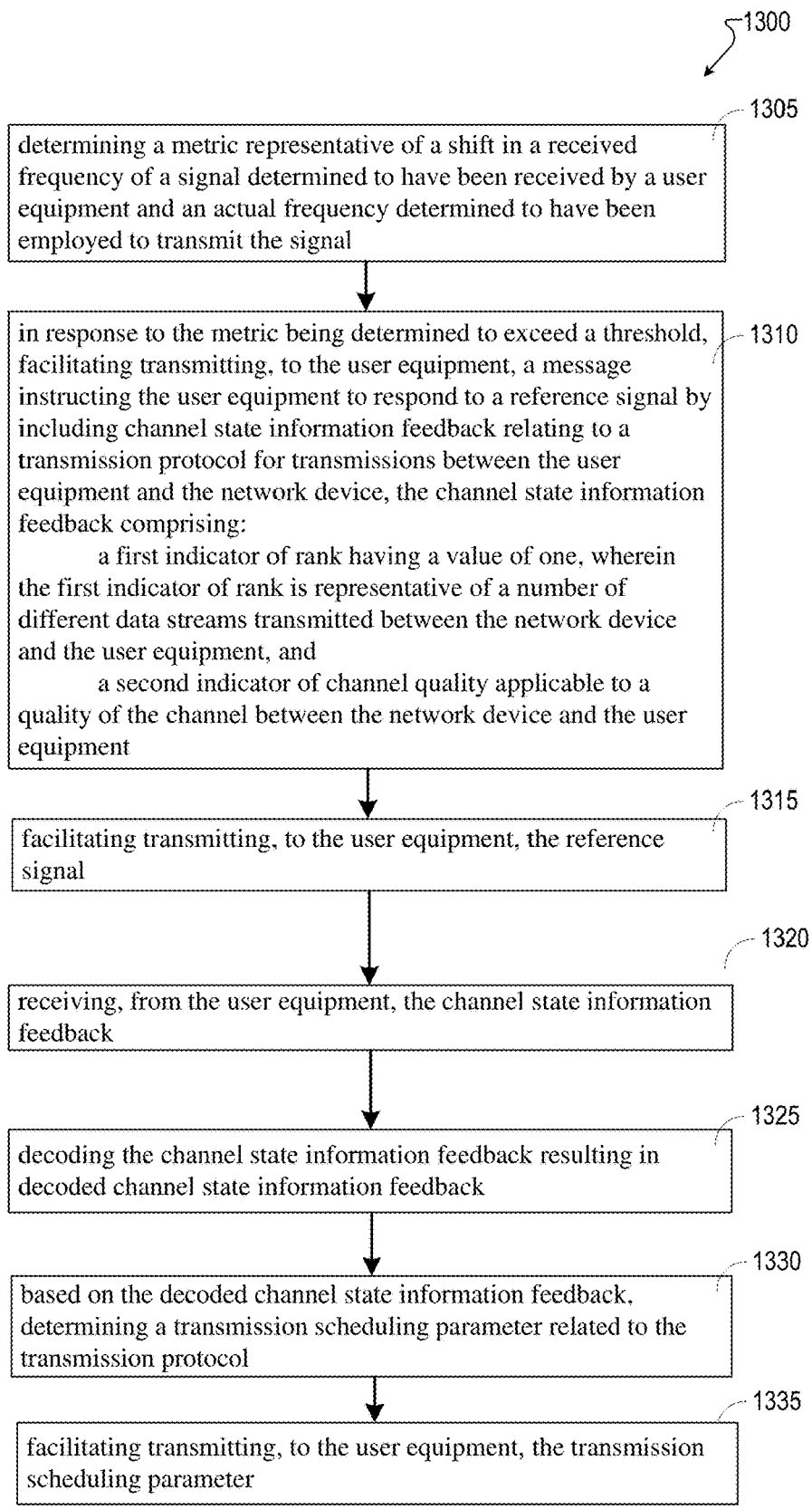
FIG. 13 illustrates operations that can be performed by a network node device relating to closed loop MIMO with CBSR, in accordance with various aspects and embodiments of the subject disclosure.

In non-limiting embodiments, as shown in FIG. 13, chart 1300, a network node device is provided, comprising a processor and a memory that stores executable instructions that, when executed by the processor, facilitate performance of operations. The operations can comprise, at step 1305, determining a metric representative of a shift in a received frequency of a signal determined to have been received by a user equipment and an actual frequency determined to have been employed to transmit the signal.

At 1310, the operations can comprise, in response to the metric being determined to exceed a threshold, facilitating transmitting, to the user equipment, a message instructing the user equipment to respond to a reference signal by including channel state information feedback relating to a transmission protocol for transmissions between the user equipment and the network device, the channel state information feedback comprising, a first indicator of rank having a value of one, wherein the first indicator of rank is representative of a number of different data streams transmitted between the network device and the user equipment, and a second indicator of channel quality applicable to a quality of the channel between the network device and the user equipment.

At step 1315, the operations can further comprise facilitating transmitting, to the user equipment, the reference signal. At step 1320, the operations can further comprise receiving, from the user equipment, the channel state information feedback. At step 1320, the operations can further comprise decoding the channel state information feedback resulting in decoded channel state information feedback. At step 1325, the operations can further comprise, based on the decoded channel state information feedback, determining a transmission scheduling parameter related to the transmission protocol. At step 1330, the operations can further comprise facilitating transmitting, to the user equipment, the transmission scheduling parameter.

The operations can further comprise facilitating transmitting, to the user equipment, traffic data based on the transmission protocol.

The determining the metric can comprise obtaining speed measurements of the user equipment at different times, and the metric can comprise a mean or median of the speed measurements. Determining the metric can also comprise determining a rate of change of a characteristic of an uplink channel from the user equipment to the network device. Determining the metric can also comprise determining a rate of change of channel quality information of transmissions between the network device and the user equipment.

The transmission scheduling parameter can comprise a modulation and coding parameter applicable to modulation and coding of data streams for the transmissions between the user equipment and the network device.

The message instructing the user equipment can comprise an instruction to exclude, from the channel state information feedback report a third indicator of channel state information used to select a precoding matrix for the transmissions between the network device and the user equipment.

Figure 14:
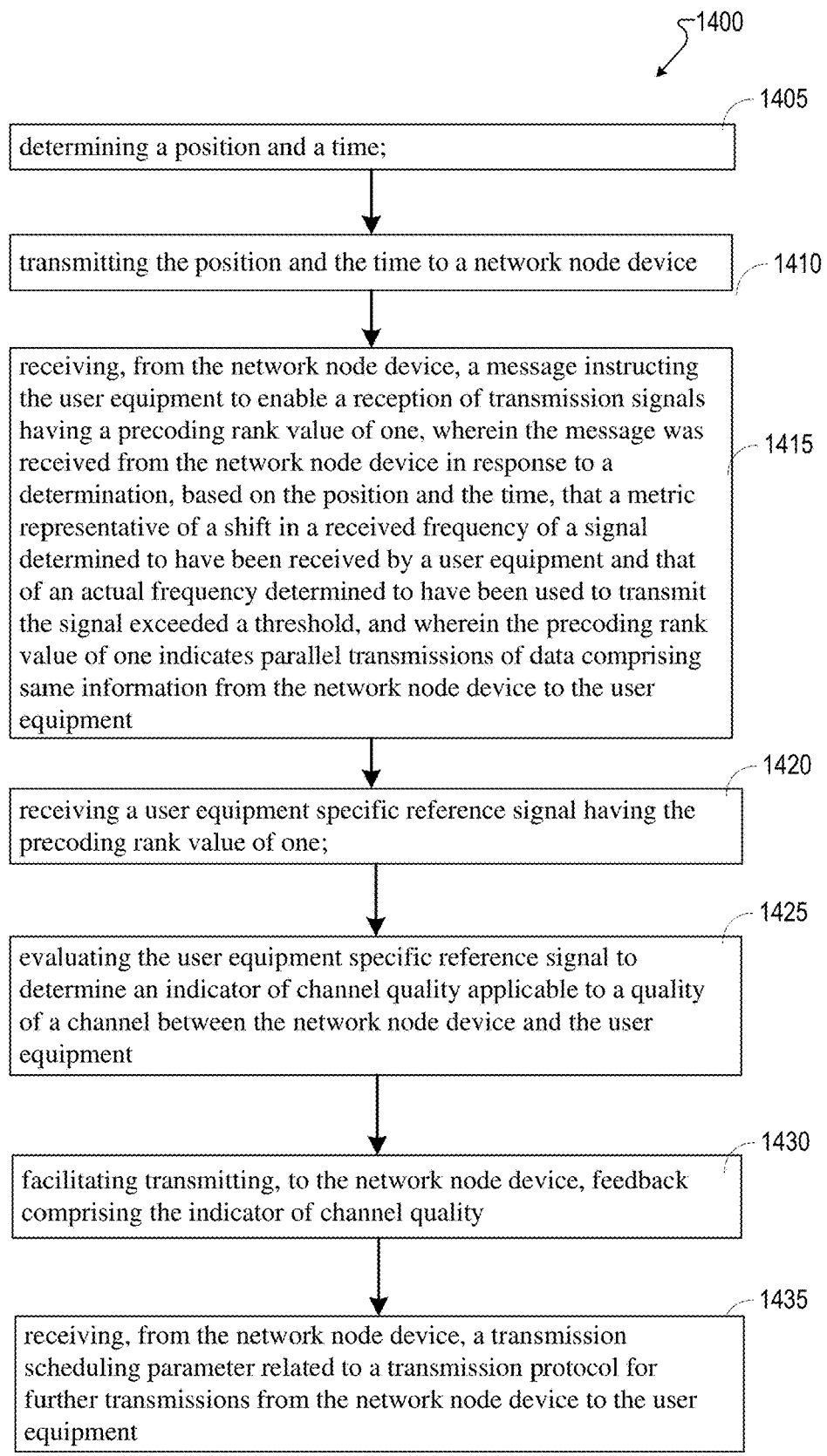
FIG. 14 illustrates operations that can be performed by a UE relating to rank-1 precoder cycling in accordance with various aspects and embodiments of the subject disclosure.

In non-limiting embodiments, as shown in FIG. 14, chart 1400, a user equipment, comprising a processor and a memory that stores executable instructions that, when executed by the processor, facilitate performance of operations. At step 1405, the operations can comprise determining a position and a time (e.g., by using a global position system, triangulation, the like). At step 1410, the operations can comprise transmitting the position and the time to a network node device.

At step 1415, the operations can further comprise receiving, from the network node device, a message instructing the user equipment to enable a reception of transmission signals having a precoding rank value of one, wherein the message was received from the network node device in response to a determination, based on the position and the time, that a metric representative of a shift in a received frequency of a signal determined to have been received by a user equipment and that of an actual frequency determined to have been used to transmit the signal exceeded a threshold, and wherein the precoding rank value of one indicates parallel transmissions of data comprising same information from the network node device to the user equipment.

At step 1420, the operations can further comprise receiving a user equipment specific reference signal having the precoding rank value of one, and at step 1425, evaluating the user equipment specific reference signal to determine an indicator of channel quality applicable to a quality of a channel between the network node device and the user equipment.

At step 1430, the operations can further comprise facilitating transmitting, to the network node device, feedback comprising the indicator of channel quality. At step 1435, the operations can further comprise receiving, from the network node device, a transmission scheduling parameter related to a transmission protocol for further transmissions from the network node device to the user equipment.

The operations can further comprise facilitating transmitting, to the user equipment, traffic data based on the transmission protocol. The transmission scheduling parameter can comprise a modulation and coding parameter applicable to modulation and coding of data streams for the further transmissions from the network node device to the user equipment.

The indicator of channel quality can comprise a first indicator of channel quality, and the message instructing the user equipment can further comprise an instruction to exclude from the feedback a second indicator of rank representative of a number of different data streams transmitted between the network node device and the user equipment, and exclude from the feedback a third indicator of channel state information used to select a precoding matrix for the transmissions between the network node device and the user equipment.

As mentioned above, the user equipment can comprise a wireless device, and can also comprise an internet of things device.

Figure 15:
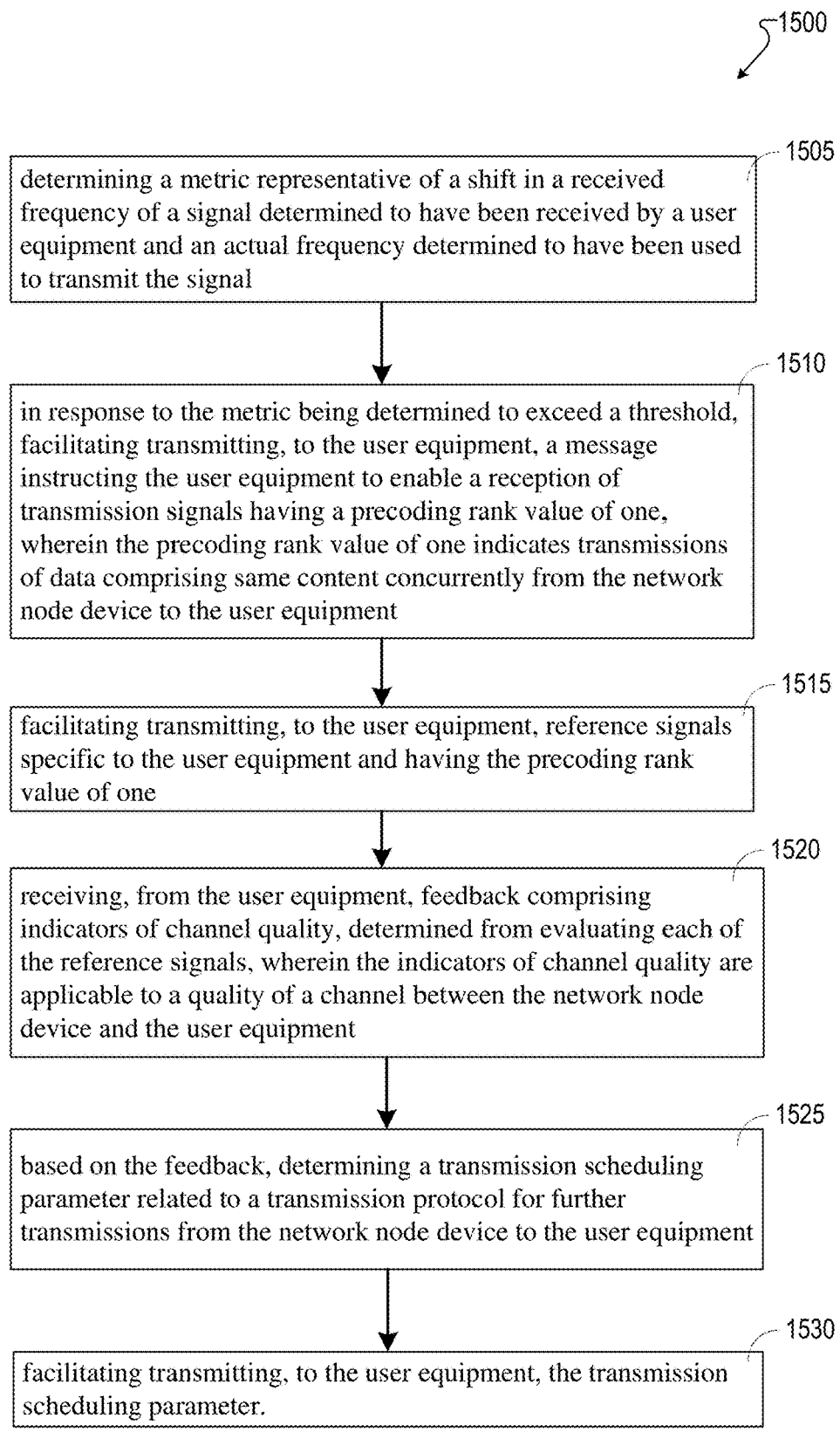
FIG. 15 illustrates another set of operations that can be performed by a network node device relating to rank-1 precoder cycling in accordance with various aspects and embodiments of the subject disclosure.

In non-limiting embodiments, as shown in FIG. 15, a network node device is provided, comprising a processor and a memory that stores executable instructions that, when executed by the processor, facilitate performance of operations. As shown at step 1505, the operations can comprise determining a metric representative of a shift in a received frequency of a signal determined to have been received by a user equipment and an actual frequency determined to have been used to transmit the signal.

The operations can further comprise, at step 1510, in response to the metric being determined to exceed a threshold, facilitating transmitting, to the user equipment, a message instructing the user equipment to enable a reception of transmission signals having a precoding rank value of one, wherein the precoding rank value of one indicates transmissions of data comprising same content concurrently from the network node device to the user equipment.

The operations can further comprise, at step 1515, facilitating transmitting, to the user equipment, reference signals specific to the user equipment and having the precoding rank value of one.

The operations can further comprise at step 1520, receiving, from the user equipment, feedback comprising indicators of channel quality, determined from evaluating each of the reference signals, wherein the indicators of channel quality are applicable to a quality of a channel between the network node device and the user equipment.

At step 1525, the operations can further comprise, based on the feedback, determining a transmission scheduling parameter related to a transmission protocol for further transmissions from the network node device to the user equipment.

The operations can at step 1530 comprise, facilitating transmitting to the user equipment the transmission scheduling parameter.

The operations can further comprise facilitating transmitting, to the user equipment, traffic data based on the transmission protocol.

The determining the metric can comprise obtaining speed measurements of the user equipment at multiple times, and the metric can comprise an average of the speed measurements. Determining the metric can also comprise determining a rate of change of a characteristic of an uplink channel from the user equipment to the network node device. Determining the metric can also comprise determining a rate of change of channel quality information of channel quality information of previous transmissions from the network node device to the user equipment, the previous transmissions occurring prior to the determining the metric.

The transmission scheduling parameter can comprise a modulation and coding parameter applicable to modulation and coding of data streams for the further transmissions from the network node device to the user equipment.

The message instructing the user equipment can further comprise an instruction to exclude from the feedback a first indicator of rank representative of a number of different data streams transmitted between the network node device and the user equipment, and a second indicator of channel state information used to select a precoding matrix for the further transmissions from the network node device to the user equipment.

Referring now to FIG. 16, illustrated is a schematic block diagram of a user equipment (e.g., user equipment 102) that can be a mobile device 1600 capable of connecting to a network in accordance with some embodiments described herein. Although a mobile handset 1600 is illustrated herein, it will be understood that other devices can be a mobile device, and that the mobile handset 1600 is merely illustrated to provide context for the embodiments of the various embodiments described herein. The following discussion is intended to provide a brief, general description of an example of a suitable environment 1600 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1600 includes a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, e.g., cellular networks, VoIP networks, and so on. Here, the communications component 1610 can also include a suitable cellular transceiver 1611 (e.g., a global GSM transceiver) and/or an unlicensed transceiver 1613 (e.g., Wi-Fi, WiMax) for corresponding signal communications. The handset 1600 can be a device such as a cellular telephone, a PDA with mobile communications capabilities, and messaging-centric devices. The communications component 1610 also facilitates communications reception from terrestrial radio networks (e.g., broadcast), digital satellite radio networks, and Internet-based radio services networks.

The handset 1600 includes a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The handset 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the handset 1600, and updated by downloading data and software.

The handset 1600 can process IP data traffic through the communication component 1610 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1622 (e.g., a camera) can be provided for decoding encoded multimedia content. The video processing component 1622 can aid in facilitating the generation, editing and sharing of video quotes. The handset 1600 also includes a power source 1624 in the form of batteries and/or an AC power subsystem, which power source 1624 can interface to an external power system or charging equipment (not shown) by a power I/O component 1626.

The handset 1600 can also include a video component 1630 for processing video content received and, for recording and transmitting video content. For example, the video component 1630 can facilitate the generation, editing and sharing of video quotes. A location tracking component 1632 facilitates geographically locating the handset 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touch screen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1638 when the Wi-Fi transceiver 1613 detects the beacon of the access point. A SIP client 1640 enables the handset 1600 to support SIP protocols and register the subscriber with the SIP registrar server. The applications 1606 can also include a client 1642 that provides at least the capability of discovery, play and store of multimedia content, for example, music.

The handset 1600, as indicated above related to the communications component 1610, includes an indoor network radio transceiver 1613 (e.g., Wi-Fi transceiver). This function supports the indoor radio link, such as IEEE 802.11, for the dual-mode GSM handset 1600. The handset 1600 can accommodate at least satellite radio services through a handset that can combine wireless voice and digital radio chipsets into a single handheld device.

Referring now to FIG. 17, there is illustrated a block diagram of a computer 1700 operable to execute the functions and operations performed in the described example embodiments. For example, a network node (e.g., network node 104) may contain components as described in FIG. 17. The computer 1700 can provide networking and communication capabilities between a wired or wireless communication network and a server and/or communication device. In order to provide additional context for various aspects thereof, FIG. 17 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 17, implementing various aspects described herein with regards to devices can include a computer 1700, the computer 1700 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multiprocessor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes read-only memory (ROM) 1727 and random access memory (RAM) 1712. A basic input/output system (BIOS) is stored in a non-volatile memory 1727 such as ROM, EPROM, EEPROM, which BIOS contains the basic routines that help to transfer information between elements within the computer 1700, such as during start-up. The RAM 1712 can also include a high-speed RAM such as static RAM for caching data.

The computer 1700 further includes an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1700 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1700, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the innovation can be implemented with various commercially available operating systems or combinations of operating systems.

A user can enter commands and information into the computer 1700 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 2394 serial port, a game port, a USB port, an IR interface, etc.

A monitor 1744 or other type of display device is also connected to the system bus 1708 through an interface, such as a video adapter 1746. In addition to the monitor 1744, a computer 1700 typically includes other peripheral output devices (not shown), such as speakers, printers, etc.

The computer 1700 can operate in a networked environment using logical connections by wired and/or wireless communications to one or more remote computers, such as a remote computer(s) 1748. The remote computer(s) 1748 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1700 is connected to the local network 1752 through a wired and/or wireless communication network interface or adapter 1756. The adapter 1756 may facilitate wired or wireless communication to the LAN 1752, which may also include a wireless access point disposed thereon for communicating with the wireless adapter 1756.

When used in a WAN networking environment, the computer 1700 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 through the input device interface 1742. In a networked environment, program modules depicted relative to the computer, or portions thereof, can be stored in the remote memory/storage device 1750. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signalling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signalling-stream from a set of subscriber stations. Data and signalling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signalling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Network node equipment, comprising:
    a processor; and
    a memory that stores executable instructions that, when executed by the processor, facilitate performance of operations, comprising:
    in response to a metric representative of a Doppler shift related to frequencies of transmissions between the network node equipment and a user equipment being determined to exceed a threshold, transmitting a message instructing the user equipment to exclude, from channel state information feedback, reporting of a rank indicator representative of a number of different data streams transmitted between the network node equipment and the user equipment;
    receiving, from the user equipment, the channel state information feedback, wherein the channel state information feedback excludes the rank indicator; and
    based on the channel state information feedback, determining a transmission scheduling parameter related to a transmission protocol for further transmissions from the network node equipment to the user equipment.

2. The network node equipment of claim 1, wherein the operations further comprise transmitting, to the user equipment, traffic data based on the transmission protocol.

3. The network node equipment of claim 1, wherein the operations further comprise:
    obtaining speed measurements of the user equipment at multiple times, and wherein the metric comprises an average of the speed measurements.

4. The network node equipment of claim 1, wherein the operations further comprise:
    determining a rate of change of a characteristic of an uplink channel from the user equipment to the network node equipment.

5. The network node equipment of claim 1, wherein the operations further comprise:
    determining a rate of change of channel quality information of previous transmissions from the network node equipment to the user equipment, the previous transmissions occurring prior to determining the metric.

6. The network node equipment of claim 1, wherein the transmission scheduling parameter comprises a modulation and coding parameter applicable to modulating and coding of data streams for the further transmissions.

7. The network node equipment of claim 1, wherein the channel state information feedback comprises an indicator of channel quality, and the message instructing the user equipment further comprises an instruction to exclude, from the channel state information feedback, a precoding matrix indicator used to select a precoding matrix for the further transmissions.

8. A method, comprising:
    determining, by network equipment comprising a processor, a metric representative of a Doppler shift related to frequencies of transmissions between the network equipment and a user equipment;
    in response to the metric being determined to exceed a threshold, facilitating, by the network equipment, transmitting a message instructing the user equipment to exclude, from a channel state information feedback, a rank indicator representative of a number of different data streams transmitted between the network equipment and the user equipment;
    facilitating, by the network equipment, receiving the channel state information feedback from the user equipment, wherein the channel state information feedback does not comprise the rank indicator; and
    based on the channel state information feedback, determining, by the network equipment, a transmission scheduling parameter related to a transmission protocol applicable to further transmissions between the user equipment and the network equipment.

9. The method of claim 8, further comprising:
    facilitating, by the network equipment, transmitting traffic data to the user equipment based on the transmission protocol.

10. The method of claim 8, wherein determining the metric comprises obtaining speed measurements of the user equipment at different times, and wherein the metric comprises a mean or a median of the speed measurements.

11. The method of claim 8, wherein determining the metric comprises determining a rate of change of a characteristic of an uplink channel from the user equipment to the network equipment.

12. The method of claim 8, wherein determining the metric comprises determining a rate of change of channel quality information of the further transmissions.

13. The method of claim 8, further comprising:
    facilitating, by the network equipment, transmitting the transmission scheduling parameter to the user equipment.

14. The method of claim 8, wherein the message instructing the user equipment further comprises an instruction to exclude, from the channel state information feedback, a channel state information indicator used to select a precoding matrix for the further transmissions.

15. A non-transitory machine-readable medium, comprising executable instructions that, when executed by a processor of a network node, facilitate performance of operations, comprising:

determining a metric representative of a Doppler shift related to frequencies of transmissions between the network node and a user equipment;

in response to the metric exceeding a threshold, transmitting a message instructing the user equipment to exclude a rank indicator from channel state information feedback;

receiving, from the user equipment, the channel state information feedback, wherein the channel state information feedback does not comprise the rank indicator; and based on the channel state information feedback, determining a transmission scheduling parameter related to a transmission protocol for further transmissions from the network node to the user equipment.

16. The non-transitory machine-readable medium of claim 15, wherein the operations further comprise:

transmitting, to the user equipment, traffic data based on the transmission protocol.

17. The non-transitory machine-readable medium of claim 15, wherein determining the metric comprises obtaining speed measurements of the user equipment at multiple times, and wherein the metric comprises an average of the speed measurements.

18. The non-transitory machine-readable medium of claim 15, wherein the operations further comprise:

transmitting, to the user equipment, the transmission scheduling parameter.

19. The non-transitory machine-readable medium of claim 15, wherein the operations further comprise:

determining a rate of change of channel quality information of previous transmissions from the network node to the user equipment, the previous transmissions occurring prior to determining the metric.

20. The non-transitory machine-readable medium of claim 15, wherein the message instructing the user equipment further comprises an instruction to exclude from the channel state information feedback a precoding matrix indicator used to select a precoding matrix for the further transmissions.

* * * * *